United States Patent
Morton et al.

(10) Patent No.: US 11,332,681 B2
(45) Date of Patent: *May 17, 2022

(54) REFINERY ANTIFOULANT PROCESS

(71) Applicant: Infineum International Limited, Abingdon (GB)

(72) Inventors: Colin Morton, Standford in the Vale (GB); Paul D. Kerby, Oxford (GB); Andrew C. Sutkowski, Norwich (GB); Krzysztof J. Maranski, Zagan (PL)

(73) Assignee: Infineum International Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,264

(22) Filed: Sep. 11, 2020

(65) Prior Publication Data

US 2021/0079308 A1 Mar. 18, 2021

(30) Foreign Application Priority Data

Sep. 17, 2019 (EP) .................................. 19197721

(51) Int. Cl.
*C10G 75/04* (2006.01)
*C09K 8/524* (2006.01)

(52) U.S. Cl.
CPC .............. *C10G 75/04* (2013.01); *C09K 8/524* (2013.01); *C10G 2300/206* (2013.01); *C10G 2300/4075* (2013.01)

(58) Field of Classification Search
CPC .............. C10G 75/04; C10G 2300/206; C10G 2300/4075; C10G 2300/80; C10G 75/02; C10G 31/06; C09K 8/524

See application file for complete search history.

(56) References Cited

U.S. PATENT DOCUMENTS

| 9,255,043 B2 * | 2/2016 | Ovalles .................... F17D 1/16 |
| 2008/0096772 A1 * | 4/2008 | Wilkes ................... C09K 8/524 507/90 |
| 2008/0146476 A1 * | 6/2008 | Harrison .............. C10M 159/24 508/567 |
| 2015/0218468 A1 | 8/2015 | Ovaskainen et al. |

FOREIGN PATENT DOCUMENTS

| EP | 1091085 A1 * | 4/2001 | ............. C10G 75/04 |
| EP | 1108775 A2 * | 6/2001 | ............. C10G 31/00 |
| WO | WO-9113951 A1 * | 9/1991 | ............. C10L 1/2437 |
| WO | WO-0127438 A1 * | 4/2001 | ............. C10G 75/04 |

* cited by examiner

*Primary Examiner* — Pamela H Weiss
(74) *Attorney, Agent, or Firm* — David M. Weisberg

(57) ABSTRACT

Fouling in a refinery vessel, such as heat transfer equipment, used in a petroleum refinery operation and in which a refineable petroleum feedstock is at an elevated temperature and in fluid communication with the refinery vessel during a petroleum refinery operation, is reduced by providing in the refineable petroleum feedstock an additive comprising (i) a poly(butylenyl)benzene sulphonic acid; or, (ii) a poly(propylenyl)benzene sulphonic acid; or, (iii) a combination of a poly(butylenyl)benzene sulphonic acid and a poly(propylenyl)benzene sulphonic acid.

35 Claims, No Drawings

REFINERY ANTIFOULANT PROCESS

CROSS-REFERENCE TO RELATED APPLICATIONS AND PRIORITY

This application claims priority to Foreign Application EP 19197721.4 filed Sep. 17, 2019 the disclosures of which are expressly incorporated herein by reference.

FIELD OF THE INVENTION

This invention relates to petroleum refinery operations. More specifically, although not exclusively, the invention relates to a process for reducing or preventing fouling of a refinery vessel, such as heat transfer equipment, used in a petroleum refinery operation and in which a refineable petroleum feedstock (and especially crude oil) is at an elevated temperature and in fluid communication with the refinery vessel during a petroleum refinery operation, especially where the refineable petroleum feedstock has an asphaltene content.

Further, the present invention relates to the use, during a petroleum refinery operation of a refineable petroleum feedstock (e.g. crude oil), of one or more 4-poly(alkylenyl) benzene sulphonic acid derivative(s) as an additive(s) in a refineable petroleum feedstock to mitigate or prevent fouling, especially asphaltene fouling, of a refinery vessel by the petroleum feedstock during the refinery operation, where the petroleum feedstock is in fluid communication with the refinery vessel and at an elevated temperature during the refinery operation; and, the use of one or more 4-poly (alkylenyl) benzene sulphonic acid derivative(s) as an additive(s) in a refineable petroleum feedstock having an asphaltene content to mitigate or prevent asphaltene agglomeration (or flocculation) and/or asphaltene precipitation in and/or from the petroleum feedstock heated at an elevated temperature, particularly such use, during a petroleum refinery operation of the refineable petroleum feedstock, where the feedstock is heated at an elevated temperature during the refinery operation.

BACKGROUND OF THE INVENTION

Petroleum refineries incur significant additional energy costs due to fouling and the resulting attendant inefficiencies caused by the fouling. More particularly, thermal processing of crude oils, blends of crude oils and fractions obtained therefrom in refinery vessels, for example heat transfer equipment such as heat exchangers and fired heaters, is hampered by the deposition of insoluble asphaltenes and other contaminants (e.g., particulates and salts) that may be found in crude oils, blends of crude oils, and fractions obtained therefrom which are refined further in a petroleum refinery. Further, the asphaltenes and other organics may thermally degrade to coke when exposed to high surface temperatures, for example high heater tube surface temperatures, found in a petroleum refinery operation.

Fouling in refinery vessels, such as heat transfer equipment, receiving petroleum feedstocks due to thermal instability of the feedstock and deposit of materials rendered insoluble by the temperature difference ($\Delta T$) between the feedstock and the refinery vessel wall (e.g. heat exchanger wall) represents a major problem in petroleum refinery operations, especially as the feedstock is typically heated to elevated temperatures, for example in some refinery operations at temperatures in excess of 300° C.

Petroleum feedstocks include asphaltenes. Asphaltenes include molecules having a large number of different and complex structures. Typically, asphaltenes comprise high molecular weight aromatic molecules, such as unsaturated macromolecules primarily of carbon and hydrogen but also containing minor components such as sulfur, oxygen, nitrogen and/or various metals, particularly heavy metals. Asphaltenes are characterized in terms of their solubility in aromatic solvents, and they are more commonly defined as that portion of a refineable petroleum feedstock (e.g. a crude oil), which is soluble in xylene and toluene, but insoluble in paraffinic solvents, such as heptane or pentane. Asphaltenes typically exist in a refineable petroleum feedstock as soluble species and/or in the form of a colloidal dispersion, through interactions with resins present in the feedstock. Suitably, the solubilisation and/or dispersion of asphaltenes in a refineable petroleum feedstock is delicately balanced and this balance may be disturbed by heating the feedstock at elevated temperatures, especially at elevated temperatures used in petroleum refinery operations to refine the feedstock.

Heating a refineable petroleum feedstock at such elevated temperatures, especially during a petroleum refinery operation, typically promotes asphaltene agglomeration in and asphaltene precipitation in and/or from the feedstock, thermal degradation of asphaltenes to coke and adherence of asphaltenes and/or coke to the hot surfaces of the refinery vessel. Further, the high $\Delta T$ found in heat transfer refinery operations results in high surface or skin temperatures when the petroleum feedstock is introduced to the refinery vessel. This high $\Delta T$ may further contribute to the precipitation of asphaltenes and other insoluble particulates from the feedstock. During the refinery operation of a petroleum feedstock the asphaltene macromolecules are stripped to form molecules having significantly different chemical structures in the finished refined product. Although such molecules in the finished refined product may also be termed as asphaltenes, these molecules have significantly different chemical and physical properties than the precursor asphaltene molecules present in the refineable petroleum feedstock (e.g. as found in crude oil).

Another common cause of fouling by a refineable petroleum feedstock during a petroleum refinery operation is attributable to the presence of salts, particulates and impurities (e.g. inorganic contaminants) found in the feedstock. For example, iron oxide/sulfide, calcium carbonate, silica, sodium chloride and calcium chloride have all been found to attach directly to the surface of a fouled heater rod and throughout the coke deposit. These solids typically promote and/or enable additional fouling by the refineable petroleum feedstock.

The buildup of insoluble deposits in a refinery vessel, such as heat transfer equipment, creates an unwanted insulating effect and reduces the heat transfer efficiency of the vessel. Fouling also reduces the cross-sectional area of process equipment, which decreases flow rates and desired pressure differentials to provide less than optimal operation. To overcome these disadvantages, the refinery vessel is ordinarily taken offline and cleaned mechanically or chemically cleaned, resulting in lost production time and in certain circumstances complete outage of part, or all, of a petroleum refinery operation.

Accordingly, there is a need to reduce fouling of a refinery vessel which is used to refine a refineable petroleum feedstock in a petroleum refinery operation, wherein the refineable petroleum feedstock is at an elevated temperature during the refinery operation. Further, there is a need to reduce precipitation of particulates, especially precipitation of asphaltenes, in and/or from a refineable petroleum feedstock and to reduce agglomeration of asphaltenes in a refineable petroleum feedstock when the feedstock is heated at an elevated temperature during a petroleum refinery operation. Further, there is a need to reduce adherence of particulates, especially adherence of asphaltenes, to the heated surface of a refinery vessel during a refinery operation of a refineable petroleum feedstock, thereby preventing and/or mitigating fouling of the vessel, and before the asphaltenes are thermally degraded or coked. This will improve the overall efficiency of the refinery operation, increase performance of heat transfer equipment, decrease or eliminate scheduled outages for fouling mitigation efforts, and reduce energy costs associated with the refinery operation.

SUMMARY OF INVENTION

The invention provides improvements in anti-fouling performance during petroleum refinery operations of a petroleum feedstock which is heated at elevated temperatures during the refinery operation.

Thus, in a first aspect, the invention provides a process for reducing or preventing fouling, especially asphaltene fouling, in a refinery vessel during a petroleum refinery operation of a refineable petroleum feedstock, the process comprising providing a refineable petroleum feedstock in fluid communication with a refinery vessel during a petroleum refinery operation, the refineable petroleum feedstock being at an elevated temperature during the refinery operation, the refineable petroleum feedstock including Additive A or Additive B, or a combination of Additive A and Additive B, wherein:
  (i) Additive A, when present, is present in an effective minor amount of from 1 to 1000 ppm by mass, based on the total mass of the refineable petroleum feedstock, and Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC; and,
  (ii) Additive B, when present, is present in an effective minor amount of from 1 to 1000 ppm by mass, based on the total mass of the refineable petroleum feedstock, and Additive B comprises one or more 4-poly(propylenyl)benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

In a second aspect, the invention provides the use, during a petroleum refinery operation of a refineable petroleum feedstock, of an effective minor amount of Additive A or Additive B, or an effective minor amount of a combination of Additive A and Additive B, as an additive, or combination of Additives A and B, in a refineable petroleum feedstock to reduce and/or prevent fouling, especially asphaltene fouling, of a petroleum refinery vessel by said petroleum feedstock, wherein: Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s), based on the total mass of all said one or more 4-poly(butylenyl)benzene sulphonic acid(s), has greater than or equal to 32 total carbon atoms in said substituent group, as determined by GC; and, Additive B comprises one or more 4-poly(propylenyl)benzene sulphonic acids, wherein the poly(propylenyl) substituent group of greater than 50 mass % of said one or more 4-poly(propylenyl)benzene sulphonic acid(s), based on the total mass of all said one or more 4-poly(propylenyl)benzene sulphonic acid(s), has greater than or equal to 21 total carbon atoms in said substituent group, as determined by GC; and, wherein said petroleum feedstock is at an elevated temperature and said petroleum feedstock is in fluid communication with the refinery vessel during the petroleum refinery operation.

Preferably, the process of the first aspect and/or the use of the second aspect reduces and/or prevents asphaltene fouling of the petroleum refinery vessel.

In a third aspect, the invention provides the use of an effective minor amount of Additive A or Additive B, or an effective minor amount of a combination of Additive A and Additive B, as an additive, or combination of Additives A and B, in a refineable petroleum feedstock having an asphaltene content to mitigate or prevent asphaltene agglomeration (or flocculation) and/or asphaltene precipitation in and/or from said refineable petroleum feedstock when said feedstock is heated at an elevated temperature, wherein: Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s), based on the total mass of all said one or more 4-poly(butylenyl)benzene sulphonic acid(s), has greater than or equal to 32 total carbon atoms in said substituent group, as determined by GC; and, Additive B comprises one or more 4-poly(propylenyl)benzene sulphonic acids wherein the poly(propylenyl) substituent group of greater than 50 mass % of said one or more 4-poly(propylenyl)benzene sulphonic acid(s), based on the total mass of all said one or more 4-poly(propylenyl)benzene sulphonic acid(s), has greater than or equal to 21 total carbon atoms in said substituent group, as determined by GC.

Preferably, the use of the third aspect is during a petroleum refinery operation of the refineable petroleum feedstock and the refineable petroleum feedstock is heated at an elevated temperature during the refinery operation. More preferably, the use of the third aspect is during a petroleum refinery operation of the refineable petroleum feedstock, said feedstock is heated at an elevated temperature and said feedstock is in fluid communication with a refinery vessel during the refinery operation, thereby mitigating or preventing asphaltene agglomeration and/or asphaltene precipitation and/or coke formation in the refinery vessel during the refinery operation.

Suitably, the process of the first aspect and/or use of the second aspect and/or use of the third aspect of the invention each independently may include the step of refining the refineable petroleum feedstock.

In a fourth aspect, the invention provides a system for refining a refineable petroleum feedstock, the system comprising: (a) a refinery vessel for refining the refineable petroleum feedstock at an elevated temperature; and, (b) a refineable petroleum feedstock in fluid communication with the refinery vessel, wherein the refineable petroleum feedstock includes Additive A or Additive B, or a combination of Additive A and Additive B, wherein:
  (i) Additive A, when present, is present in an effective minor amount of from 1 to 1000 ppm by mass, based on the total mass of the refineable petroleum feedstock, and Additive (A) comprises one or more 4-poly(butylenyl)benzene sulphonic acid(s), wherein the poly(butylenyl) substituent group of greater than 50 mass % of said one or more 4-poly(butylenyl)benzene sulphonic acid(s), based on the total mass of all said one or more 4-poly(butylenyl)benzene sulphonic acid(s), has greater than or equal to 32 total carbon atoms in said substituent group, as determined by GC; and, (ii) Additive B, when present, is present in an effective minor amount of from 1 to 1000 ppm by mass, based on the total mass of the refineable petroleum feedstock, and Additive B comprises one or more 4-poly(propylenyl)benzene sulphonic acids wherein the poly(propylenyl) substituent group of greater than 50 mass % of said one or more 4-poly(propylenyl)benzene sulphonic acid(s), based on the total mass of all said one or more 4-poly(propylenyl)benzene sulphonic acid(s), has greater than or equal to 21 total carbon atoms in said substituent group, as determined by GC.

Suitably, the refineable petroleum feedstock of the fourth aspect of the invention is at an elevated temperature.

Suitably, the refineable petroleum feedstock as defined in the first, second and fourth aspects has an asphaltene content.

Unexpectedly, it has been found that a significant reduction in fouling, especially asphaltene fouling, of a refinery vessel used to refine a refineable petroleum feedstock during a refinery operation may be achieved by employing the particular 4-poly(butylenyl)benzene sulphonic acid(s) (Additive A) or the particular 4-poly(propylenyl)benzene sulphonic acid(s) (Additive B) as an additive in the feedstock, when a major amount of the poly(butylenyl) substituent groups of Additive A or a major amount of the poly(propylenyl) substituent groups of Additive B have the defined narrow total carbon chain length distribution. Further, this technical effect is achievable by adding a relatively small amount (e.g. 1 to 1000, preferably 1 to less than 100, ppm by mass) of Additive A or Additive B to the refineable petroleum feedstock. Suitably, the use of a relatively small amount (e.g. 1 to 1000, preferably 1 to less than 100, ppm by mass) of the particular 4-poly(butylenyl)benzene sulphonic acid(s)(Additive A) or the particular 4-poly(propylenyl)benzene sulphonic acid(s) (Additive B), in a refineable petroleum feedstock typically significantly reduces fouling by the feedstock during a refinery operation, reduces asphaltene agglomeration (or flocculation) and/or asphaltene precipitation in and/or from the feedstock, compared with the refineable petroleum feedstock not including either Additive A or Additive B, when the feedstock is heated at an elevated temperature, especially when the feedstock is heated at an elevated temperature employed during a petroleum refinery operation. Further, it has unexpectedly been found, the use of Additive A is more effective than the use of Additive B.

Thus, according to a preferred embodiment of each and every aspect of the invention, an effective minor amount of Additive A is added to the refineable petroleum feedstock.

Unexpectedly, it has also been found, that the use of a combination of Additive A and Additive B in a refineable petroleum feedstock typically provides a further significant reduction in fouling, especially asphaltene fouling, of a refinery vessel used to refine the refineable petroleum feedstock during a refinery operation. Furthermore, the use of the combination of Additive A and Additive B typically provides a further reduction of asphaltene agglomeration (or flocculation) and/or asphaltene precipitation in and/or from the feedstock when the feedstock is heated at an elevated temperature, especially heated at an elevated temperature employed during a petroleum refinery operation. Accordingly, the use of the combination of Additive A and Additive B permits a further reduction in fouling, especially asphaltene fouling, of a refinery vessel used to refine a refineable petroleum feedstock during a refinery operation. Further, it has unexpectedly been found, the use of a combination of Additive A and Additive B may provide a synergistic reduction in fouling by the feedstock, and/or reduction of asphaltene agglomeration (or flocculation) and/or asphaltene precipitation in and/or from the feedstock when the feedstock is heated at an elevated temperature.

Thus, according to a preferred embodiment of each and every aspect of the invention, a combination of Additive A and Additive B is added to the refineable petroleum feedstock.

Advantageously, the use, during a refinery operation of a refineable petroleum feedstock, of Additive A or Additive B, or a combination of Additive A and Additive B, as an additive, or combination of additives A and B, in a refineable petroleum feedstock typically improves the overall efficiency of the refinery operation, increases performance of refinery vessels (e.g. heat transfer equipment) used during the refinery operation, decreases or eliminates scheduled outages for fouling mitigation efforts, and/or reduces energy costs associated with the refinery operation.

Suitably, the refineable petroleum feedstock is at, preferably heated to, an elevated temperature during a refinery operation. The refineable petroleum feedstock may be heated at a number of different points during the refinery operation, for example, in a pre-heater and/or heat exchanger located up-stream of a desalting unit, in a heater/furnace located upstream of a distillation unit, in a distillation unit, in a cracking unit, in a coking unit. Further, the refineable petroleum feedstock is typically heated at different temperatures in such units. Suitably, the temperature of the refineable petroleum feedstock is typically increased incrementally from the beginning to the end of the refinery operation. Suitably, the refineable petroleum feedstock is heated to an elevated temperature of greater than 40, preferably greater than 60, more preferably greater than 80, even more preferably greater than 100, ° C. during a refinery operation, for example in a pre-heater and/or heat exchanger located upstream of a desalting unit. Suitably, the refineable petroleum feedstock is heated to an elevated temperature of greater than 200, preferably greater than 300, more preferably greater than 325, ° C. during a refinery operation, for example in a heater/furnace located upstream of a distillation unit, particularly such a furnace/heater located downstream of a desalting unit and upstream of a distillation unit, especially an atmospheric distillation unit.

Suitably, in any one of the first to fourth aspects of the invention, the refineable petroleum feedstock may be at an elevated temperature of greater than 40° C., preferably greater than 60° C., more preferably greater than 80° C., even more preferably greater than 100° C., even more preferably greater than 120° C. Suitably, in any one of the first to fourth aspects of the invention, the refineable petroleum feedstock may be at an elevated temperature of greater than 200, preferably greater than or equal to 300, more preferably greater than or equal to 325, ° C.

Preferably, the refineable petroleum feedstock, as defined in any one of the first to fourth aspects of the invention, comprises a crude oil, a crude oil blend comprising two or more different types of crude oil and fractions obtained from refining a crude oil and a crude oil blend which fractions are further refined in a petroleum refinery operation. Suitably, the crude oil, crude oil blend and fractions obtained therefrom have an asphaltene content.

Suitably, the refinery vessel, as defined in any one of the first to fourth aspects of the invention, is selected from one or more of a heat transfer component (e.g. a heat exchanger, a furnace/heater, and/or a pre-heater), a distillation unit, a catalytic cracking unit, a hydrocracker, a visbreaker, a coker unit, a hydrotreater, a catalytic reformer, an alkylation unit, and said associated process transport mechanisms that are internal to, at least partially constitute, and/or are in direct fluid communication with such components. Preferably, the refinery vessel is selected from one or more of a heat exchanger, a furnace/heater, and/or a pre-heater and the associated process transport mechanisms that are internal to, at least partially constitute, and/or are in direct fluid communication with such components.

Suitably, in any one of the first to fourth aspects of the invention, Additive A may be added to the refineable petroleum feedstock before the feedstock reaches the refinery (e.g. during transportation of the feedstock to the refinery and/or during storage of the feedstock before the refinery) and/or when the feedstock is at the refinery.

Preferably, Additive A is added to the feedstock at the refinery. Additive A may be added to the feedstock at the refinery at any stage before a petroleum refinery operation on the feedstock (e.g. added to the feedstock being stored at the refinery) and/or during a petroleum refinery operation on the feedstock (e.g. added to the feedstock being transported in a flowline which feeds a refinery process). Preferably, Additive A is added to the petroleum feedstock during a petroleum refinery operation.

Preferably, Additive A is added to the petroleum feedstock at a petroleum refinery, especially during a petroleum refinery operation, and at a stage before the feedstock enters a heat transfer component (e.g. a heat exchanger, a furnace/heater, and/or a pre-heater) for heating the petroleum feedstock during the refinery operation. More preferably, Additive A is added to the refineable petroleum feedstock (e.g. crude oil or blend of crude oils) at a petroleum refinery, especially during a petroleum refinery operation, and at one or more stages comprising: (i) before the feedstock enters a preheater located upstream of a desalting unit; (ii) before the feedstock (e.g. crude oil or blend of crude oils) enters a heat exchanger located upstream of a desalting unit; (iii) before the feedstock (e.g. crude oil or blend of crude oils) enters a heater/furnace located downstream of a desalting unit and up-stream of a distillation unit, such as an atmospheric distillation unit.

Suitably, in any one of the first to fourth aspects of the invention, Additive B may be added to the refineable petroleum feedstock before the feedstock reaches the refinery (e.g. during transportation of the feedstock to the refinery and/or during storage of the feedstock before the refinery) and/or when the feedstock is at the refinery.

Preferably, Additive B is added to the feedstock at the refinery. Additive B may be added to the feedstock at the refinery at any stage before a petroleum refinery operation on the feedstock (e.g. added to the feedstock being stored at the refinery) and/or during a petroleum refinery operation on the feedstock (e.g. added to the feedstock being transported in a flowline which feeds a refinery process). Preferably, Additive B is added to the petroleum feedstock during a petroleum refinery operation.

Preferably, Additive B is added to the petroleum feedstock at a petroleum refinery, especially during a petroleum refinery operation, and at a stage before the feedstock enters a heat transfer component (e.g. a heat exchanger, a furnace/heater, and/or a pre-heater) for heating the petroleum feedstock during the refinery operation. More preferably, Additive B is added to the refineable petroleum feedstock (e.g. crude oil or blend of crude oils) at a petroleum refinery, especially during a petroleum refinery operation, and at one or more stages comprising: (i) before the feedstock enters a preheater located upstream of a desalting unit; (ii) before the feedstock (e.g. crude oil or blend of crude oils) enters a heat exchanger located upstream of a desalting unit; (iii) before the feedstock (e.g. crude oil or blend of crude oils) enters a heater/furnace located downstream of a desalting unit and up-stream of a distillation unit, such as an atmospheric distillation unit.

Suitably, in any one of the first to fourth aspects of the invention, Additive B, when used in combination with Additive A, may be added to the refineable petroleum feedstock simultaneously with or sequentially to Additive A. Preferably, Additive B is added to the refineable petroleum feedstock essentially simultaneously with Additive A. Additive A and Additive B may be in the form of a single additive package.

Suitably, in any one of the first to fourth aspects of the invention, Additive B, when used in combination with Additive A, may be added to the refineable petroleum feedstock at the same stage or a different stage of the refinery operation as Additive A. Preferably, Additive B is added to the feedstock at the same stage of the refinery operation as Additive A, more preferably Additive A and Additive B are added essentially simultaneously to the feedstock at the same stage of the refinery operation.

In accordance with a preferred embodiment when a combination of Additive A and Additive B is used, Additive A and Additive B are added to the refineable petroleum feedstock (e.g. crude oil or a crude oil blend comprising two or more different crude oils) essentially simultaneously when the feedstock is at the refinery, in particular during a petroleum refinery operation, and at one or more of the following stages: (i) before the feedstock enters a preheater located upstream of a desalting unit; (ii) before the feedstock enters a heat exchanger located upstream of a desalting unit; (iii) before the feedstock enters a heater/furnace located downstream of a desalting unit and up-stream of a distillation unit, such as an atmospheric distillation unit; or a combination thereof.

Suitably, in any one of the first to fourth aspects of the invention, the poly(butylenyl) substituent group of greater than or equal to 55, preferably greater than or equal to 60, more preferably greater than or equal to 65, mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC.

Suitably, in any one of the first to fourth aspects of the invention, the poly(butylenyl) substituent group of less than or equal to 35, preferably less than or equal to 30, more preferably less than or equal to 25, more preferably less than or equal to 20, mass % of said one or more 4-poly(butylenyl) benzene sulphonic acid(s) of Additive A, based on the total mass of all said one or more 4-poly(butylenyl)benzene sulphonic acid(s), has greater than or equal to 60 total carbon atoms in said substituent group, as determined by GC.

Suitably, in any one of the first to fourth aspects of the invention, the poly(butylenyl) substituent group of from 40 to 70, preferably 40 to 65, mass % of said one or more 4-poly(butylenyl)benzene sulphonic acid(s) of Additive A, based on the total mass of all said one or more 4-poly(butylenyl)benzene sulphonic acid(s), has from 32 to 56 total carbon atoms in said substituent group, as determined by GC.

Suitably, in any one of the first to fourth aspects of the invention, the poly(butylenyl) substituent group of said one or more 4-poly(butylenyl)benzene sulphonic acid(s) of Additive A includes a poly(butylenyl) substituent group having 32, 36, 40, 44 and/or 48, preferably 32, 36 and/or 40, total carbon atoms, as determined by GC.

Suitably, in any one of the first to fourth aspects of the invention, Additive A has a number average molecular weight ($M_n$) of from 550 to 800 daltons, as determined by the liquid-liquid extraction and potentiometric titration method described herein, preferably a number average molecular weight ($M_n$) of 550 to 800 daltons and a polydispersity index of 1.1. to 1.5.

Suitably, in any one of the first to fourth aspects of the invention, the poly(butylenyl) substituent group of said one or more 4-poly(butylenyl)benzene sulphonic acids of Additive A is derived from the polymerization of but-1-ene.

Suitably, the poly(butylenyl) substituent group of said one or more 4-poly(butylenyl)benzene sulphonic acid(s), Additive A, has a branched chain structure. By "branched chain structure" we mean the polybutylenyl substituent group consists of a branched chain butanediyl repeating radical. The poly(butylenyl) substituent group may be regarded as consisting essentially of a relatively long straight acyclic alkyl chain bonded to the benzene ring and said alkyl chain is further substituted by two or more methyl and/or ethyl groups along the length of the chain (i.e. the branching is along the relatively long alkyl chain by virtue of pendant methyl and/or ethyl substituent groups). It has been found that when Additive A includes such a branched chain poly(butylenyl) substituent group, then this typically further reduces fouling by the feedstock, asphaltene agglomeration (or flocculation) and/or asphaltene precipitation in and/or from the feedstock when the feedstock is heated at an elevated temperature, compared to the use of poly(alkylenyl)benzene sulphonic acid additive(s) in which the poly(alkylenyl) substituent group is an essentially straight carbon chain.

Suitably, in any one of the first to fourth aspects of the invention, a highly preferred Additive A comprises one or more 4-poly(butylenyl)benzene sulphonic acids, wherein the poly(butylenyl) substituent group is derived by polymerising but-1-ene, the poly(butylenyl) substituent group has a branched chain structure, the poly(butylenyl) substituent group of greater than or equal to 55 mass % of said one or more 4-poly(butylenyl)benzene sulphonic acid(s) has greater than or equal to 32 total carbon atoms in said substituent group, the poly(butylenyl) substituent group of from 40 to 65 mass % of said one or more 4-poly(butylenyl)benzene sulphonic acid(s) has from 32 to 56 total carbon atoms in said substituent group, and the poly(butylenyl) substituent group comprises a poly(butylenyl) substituent group having 32, 36 and/or 40 total carbon atoms. Preferably, in such a highly preferred Additive A, Additive A has a number average molecular weight ($M_n$) of from 550 to 800 daltons and a polydispersity index of from 1.1 to 1.5.

Suitably, Additive A may be present in the refineable petroleum feedstock in an amount of from 1 to 1000, preferably 1 to 500, more preferably 1 to 100, most preferably 1 to less than 100, ppm by mass, based on the total mass of the feedstock.

Suitably, in any one of the first to fourth aspects of the invention, the poly(propylenyl) substituent group of greater than or equal to 55, preferably greater than or equal to 60, more preferably greater than or equal to 65, more preferably greater than or equal to than 70, even more preferably greater than or equal to than 75, mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

Suitably, in any one of the first to fourth aspects of the invention, the poly(propylenyl) substituent group of less than or equal to 30, preferably less than or equal to 25, more preferably less than or equal to 20, mass % of said one or more 4-poly(propylenyl)benzene sulphonic acid(s) of Additive B, based on the total mass of all said one or more 4-poly(propylenyl)benzene sulphonic acid(s), has greater than or equal to 30 total carbon atoms in said substituent group, as determined by GC.

Suitably, in any one of the first to fourth aspects of the invention, the poly(propylenyl) substituent group of from 60 to 95, preferably 65 to 95, more preferably 67 to 90, mass % of said one or more 4-poly(propylenyl)benzene sulphonic acid(s) of Additive B, based on the total mass of all said one or more 4-poly(propylenyl)benzene sulphonic acid(s), has from 21 to 27 total carbon atoms in said substituent group, as determined by GC.

Suitably, in any one of the first to fourth aspects of the invention, the poly(propylenyl) substituent group of said one or more 4-poly(propylenyl)benzene sulphonic acid(s) of Additive B includes a poly(propylenyl) substituent group having 21, 24 and for 27 total carbon atoms, as determined by GC.

Suitably, in any one of the first to fourth aspects of the invention, Additive B has a number average molecular weight ($M_n$) of 400 to 600 daltons, as determined by the liquid-liquid extraction and potentiometric titration method described herein.

Suitably, in any one of the first to fourth aspects of the invention, the poly(propylenyl) substituent group of said one or more 4-poly(propylenyl)benzene sulphonic acid(s) of Additive B is derived from the polymerization of prop-1-ene.

Suitably, the poly(propylenyl) substituent group of said one or more poly(propylenyl)benzene sulphonic acids, Additive B, has a branched chain structure, i.e. the poly(propylenyl) substituent group consists of the branched propanediyl repeating radical. The poly(propylenyl) substituent group may be regarded as consisting essentially of a relatively long straight acyclic alkyl chain bonded to the benzene ring and said alkyl chain is further substituted by two or more methyl groups along the length of the chain (i.e. the branching is along the relatively long alkyl chain by virtue of pendant methyl substituent groups).

Suitably, in any one of the first to fourth aspects of the invention, a highly preferred Additive B comprises one or more 4-poly(propylenyl)benzene sulphonic acids, wherein the poly(propylenyl) substituent group is derived by polymerising prop-1-ene, the poly(propylenyl) substituent group has a branched chain structure, the poly(propylenyl) substituent group of greater than or equal to 60 mass % of said one or more 4-poly(propylenyl)benzene sulphonic acid(s) has greater than or equal to 21 total carbon atoms in said substituent group, the poly(propylenyl) substituent group of from 65 to 95 mass % of said one or more 4-poly(propylenyl)benzene sulphonic acid(s) has from 21 to 27 total carbon atoms in said substituent group, and the poly(propylenyl) substituent group includes a poly(propylenyl) substituent group having 21, 24 and/or 27 total carbon atoms. Preferably, in such a highly preferred Additive B, Additive B has a number average molecular weight ($M_n$) of from 400 to 600 daltons.

Suitably, Additive B may be present in the refineable petroleum feedstock in an amount of from 1 to 1000, preferably 1 to 500, more preferably 1 to 100, most preferably 1 to less than 100, ppm by mass, based on the total mass of the feedstock.

Suitably, when a combination of Additive A and Additive B is used in any one of the first to fourth aspects of the invention, the combined treat rate of Additive A and Additive B is from 2 to 2000, preferably 2 to 1000, more preferably 2 to 200, even more preferably 2 to less than 100, ppm by mass, based on the total mass of the feedstock.

Suitably, when a combination of Additive A and Additive B is used in any one of the first to fourth aspects of the invention, the mass:mass ratio of Additive A to Additive B is in the range of 20:1 to 1:20, such as 10:1 to 1:10, preferably 3:1 to 1:3. Most preferably, Additive A is used in an amount in excess of Additive B and the mass:mass ratio of Additive A to Additive B is in the range of 20:1 to 1:1, such as 10:1 to 1:1, preferably 3:1 to 1:1. Unexpectedly, a strong synergistic effect is typically observed when Additive A is used in an amount in excess of Additive B.

Suitably, Additive A, Additive B, and a combination of Additive A and Additive B, are each independently soluble or dispersible in the refineable petroleum feedstock.

Definitions

In this specification, the following words and expressions, if and when used, shall have the meanings ascribed below:

"Active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of" or "consists essentially of" or cognates may be embraced within "comprises" or any cognate word. The expression "consists essentially of" permits inclusion of substances not materially affecting the characteristics of the composition to which it applies. The expression "consists of" or cognates means only the stated features, steps, integers components or groups thereof are present to which the expression refers;

"Ashless" in relation to an additive means the additive does not include a metal;

"Ash-containing" in relation to an additive means the additive includes a metal;

"Fouling" generally refers to the accumulation of unwanted materials in a refinery vessel, especially on the surface(s) of the refinery vessel. "Fouling" embraces fouling caused primarily by the presence of variable amounts of organic particulates, especially "asphaltene fouling", or inorganic particulates. Organic particulates include, but are not limited to, insoluble matter precipitated out of the petroleum feedstock (e.g. asphaltenes) when the feedstock is at, suitably heated to, an elevated temperature during a refinery operation. Inorganic particulates include but are not limited to silica, iron oxide, iron sulfide, alkaline earth metal oxides, sodium chloride, calcium chloride and other inorganic salts. One major source of these particulates results from incomplete solids removal during desalting and/or other particulate removing processes. Solids promote the fouling of crude oils, blends and fractions obtained therefrom due to physical effects by modifying the surface area of heat transfer equipment, allowing for longer holdup times at wall temperatures and causing coke formation from asphaltenes and/or crude oil(s);

"Asphaltene fouling" refers to the accumulation of asphaltenes and/or formation of coke particles therefrom, especially asphaltene accumulation, in a refinery vessel, particularly on the surface(s) of the refinery vessel. Asphaltene fouling is generally consequential to asphaltene agglomeration in and/or asphaltene precipitation in and/or from the refineable petroleum feedstock when the feedstock is at an elevated temperature, especially the elevated temperatures employed during a petroleum refinery operation. Thermal degradation of asphaltenes to coke typically occurs due to the relatively high refinery operating temperatures. Asphaltene fouling may also be promoted by the presence of an incomplete removal of inorganic particulates from crude oil, blends and fractions obtained therefrom;

"Petroleum refinery operation" means any process which is, or can be, employed in refining a petroleum feedstock, such as any process employed in an oil refinery operation. Petroleum refining operation embraces any process which is, or can be, employed in refining a crude oil, crude oil blends comprising two or more different crude oils and the further refining of fractions obtained from refining crude oil and crude oil blends. Petroleum refinery operations typically include, but are not limited to, the following processing units, components and/or apparatus: a desalting unit to remove inorganic salts from the feedstock (i.e. crude oil); heat transfer components such as a heat exchanger, a furnace, a crude preheater, a coker preheater, to heat the petroleum feedstock; an atmospheric distillation unit to distill the feedstock (i.e. crude oil) into various fractions; a vacuum distillation unit to further distill the heavy bottom fractions from the atmospheric distillation unit; a catalytic cracking unit (e.g. fluid catalytic cracking unit) to break larger molecules into smaller, lighter hydrocarbon fractions; a catalytic hydrocracking unit to upgrade heavier aromatic and unsaturated fractions from the distillation units to gasoline, jet fuel and gasoil; a visbreaker unit to upgrade the heavy bottom fractions from the vacuum distillation unit by thermally cracking them into lighter hydrocarbon fractions; a coking unit (e.g. delayed coking, fluid coking, flexi-coking unit) to thermally crack very heavy residual oil fractions from the distillation units, especially vacuum distillation unit, to end-products, such as petroleum coke, naptha and diesel oil by-products; a hydrotreater to desulfurize fractions from the distillation units; a catalytic reforming unit to convert desulfurized fractions to higher-octane molecules; an isomerization unit to convert linear molecular fractions into higher-octane branched molecular fractions;

"Refinery vessel" means any component part and/or apparatus of a petroleum refinery operation, such as an oil refinery process, which is in fluid communication with the refineable petroleum feedstock and which is, or can be, susceptible to fouling. Refinery vessels include, but are not limited to, the aforementioned processing units, components and/or apparatus of a "petroleum refinery operation", especially heat transfer components such as a heat exchanger, a furnace, a crude preheater, a coker preheater, or any other heaters, a FCC slurry bottom, a debutanizer exchanger/tower, other feed/effluent exchangers, furnace air preheaters in refinery facilities, flare compressor components, steam cracker/reformer tubes in petrochemical facilities, a fractionation or distillation column, a scrubber, a reactor, a liquid-jacketed tank, a pipestill, a coker, a hydrocracker, a hydrotreater, a catalytic reformer, an isomerization plant, and a visbreaker. It is understood that "refinery vessel", as used herein, encompasses tubes, piping, baffles and other process transport mechanisms that are internal to, at least partially constitute, and/or are in direct fluid communication with, any one of the above-mentioned refinery components.

"Refineable petroleum feedstock" embraces a crude oil, crude oil blends comprising two or more different crude oils, and fractions obtained from refining crude oil and blends thereof which fractions are further refined in a petroleum refinery operation to form a commercial end-product. For example, fractions obtained from refining crude oil which are further refined include, but are not limited to, distillate fractions obtained from an atmospheric crude oil distillation unit which may be further processed, for example, in a hydrotreater, a catalytic reformer, and/or an isomerization unit; atmospheric gas oil obtained from an atmospheric crude oil distillation unit which may be further processed, for example, in a hydrotreater and catalytic converter; atmospheric bottoms (heavy residua) from an atmospheric crude oil distillation unit which are used as feedstock for a vacuum distillation unit; vacuum gas oil obtained from a vacuum distillation unit which may be subjected to catalytic cracking and/or hydrocracking; bottom products from a vacuum distillation unit which are used as feedstock of a visbreaker and coking unit. The term "refineable petroleum feedstock" does not include the ultimate refined commercial end-products of the petroleum refinery operation which are not subjected to a further refining operation, such as gasoline and diesel fuels, light and heavy naphtha, kerosene, heavy fuel oils, and lubricating oils.

"Refineable petroleum feedstock having an asphaltene content" means a refineable petroleum feedstock, as defined herein, which includes asphaltenes;

"Crude Oil" refers to the hydrocarbon fossil fuel oil located underground and which is extracted and refined in a petroleum refinery operation. Crude oil embraces intermediate (light) crude oils, medium crude oils, heavy crude oils and shale oils;

"Hydrocarbyl group" means a univalent radical that contains hydrogen and carbon atoms only and it is bonded to the remainder of the compound directly via a single carbon atom. The term "hydrocarbyl group" includes "alkyl", "alkylenyl", "alkenyl", "allyl" and "aryl" groups. Preferably, the hydrocarbyl group is an aliphatic hydrocarbyl group, more preferably the hydrocarbyl group is a saturated aliphatic hydrocarbyl group, even more preferably a branched-chain saturated aliphatic hydrocarbyl group, even more preferably a branched-chain alkyl group, even more preferably a branched-chain acyclic alkyl group;

"Alkyl group" means a univalent alkyl radical (i.e. a monovalent hydrocarbon group containing no double or triple bonds) which is bonded to the remainder of the compound directly via a single carbon atom. Preferably, the alkyl group is a branched-chain acyclic alkyl group.

"Alkylene" is synonymous with "alkanediyl" and means a bivalent saturated hydrocarbon radical derived from an alkane by removal of a hydrogen atom from two different carbon atoms (i.e. a divalent hydrocarbon radical containing no double or triple bonds); it may be linear or branched.

"Poly(alkylene)" is synonymous with "poly(alkene)" and means a polymer containing the appropriate alkanediyl repeating radical. Such polymers may be formed by polymerization of the appropriate alkene (e.g. poly(butylene) may be formed by polymerizing but-1-ene, but-2-ene and/or 2-methyl propene; and poly(propylene) may be formed by polymerizing propene).

"Poly(alkylenyl)" substituent group means a univalent polymer substituent group containing the appropriate alkanediyl repeating radical which is bonded to the rest of the compound via a single carbon atom. Suitably, a poly (alkylenyl) group may be formed from the corresponding poly(alkylene) (e.g. a poly(butylenyl) group may be formed from poly(butylene), a poly(propylenyl) group may be formed from poly(propylene);

Reference to a group or compound being a particular polymer (e.g. poly(propylenyl) group, poly(butylenyl) group, poly(butylene), poly(propylene)) encompasses polymers that preferably consist of the respective alkanediyl repeating radical, but also extends to those which contain primarily the respective alkanediyl repeating radical along with negligible amounts of other substitutions and/or interruptions along the polymer chain. In other words, reference to a group being a poly(butylenyl) group or poly(propylenyl) in its broadest aspect does not require that the group consist of 100% butanediyl or 100% propanediyl, respectively, repeating radicals without, for example, any linking groups, substitutions, or impurities. Such impurities or other substituents may be present in relatively minor amounts provided they do not materially affect the performance of the additive compared with the same additive containing the respective alkanediyl repeating radical at 100% purity;

"Alkene" is synonymous with "alkylene" and means a hydrocarbon compound which includes one or more carbon to carbon double bonds, such as propylene or propene, prop-1ene, butylene or butene, and but-1-ene;

"Alkenyl group" means a monovalent hydrocarbon radical which includes one or more carbon to carbon double bonds and is bonded to the remainder of the compound directly via a single carbon atom;

"halo" or "halogen" includes fluoro, chloro, bromo and iodo;

"oil-soluble" or "oil-dispersible", or cognate terms, used herein do not necessarily indicate that the compounds or additives are soluble, dissolvable, miscible, or are capable of being suspended in the petroleum feedstock in all proportions. These do mean, however, that Additive A, Additive B and a combination of Additive A and Additive B are, for example, soluble or stably dispersible in the feedstock to an extent sufficient to exert their intended effect. Moreover, the additional incorporation of other additives may also permit incorporation of higher levels of a particular additive(s), if desired;

"major amount" means in excess of 50 mass %, preferably 60 mass % or more, more preferably 70 mass % or more, even more preferably 80 mass % or more, of a composition;

"minor amount" means less than 50 mass %, preferably less than or equal to 40 mass %, more preferably less than or equal to 30 mass %, even more preferably less than or equal to 20 mass %, of a composition;

"effective amount" in respect of an additive, or combination of additives, means an amount of such additive(s) in a composition that is effective to provide, and provides, the desired technical effect;

"ppm" means parts per million by mass, based on the total mass of the composition;

"TBN" in relation to an additive component or of a composition, means total base number (mg KOH/g) as measured by ASTM D2896;

"$KV_{100}$" means kinematic viscosity at 100° C. as measured by ASTM D445;

$M_n$ means number average molecular weight. $M_n$ of Additive A and Additive B may be determined by the liquid-liquid extraction and two-phase potentiometric titration method described herein. $M_n$ of the poly(butylene) used to synthesise Additive A may be determined by gel permeation chromatography; $M_n$ of the poly(propylene) used to synthesise Additive B may be determined by gas chromatography (GC) using a flame ionization detector (FID) and simulated distillation in accordance with ASTM D2887, as described herein;

$M_w$ means weight average molecular weight. $M_w$ of Additive A and Additive B may be determined by gas chromatography (GC) and simulated distillation in accordance with ASTM D2887 using a flame ionization detector (FID), as described herein. $M_w$ of the respective poly(butylene) and poly(propylene) used to synthesise Additive A and Additive B may be determined by GC using the same method;

"Polydispersity index" of a polymeric entity means $M_w/M_n$ of the polymeric entity and represents an index of the breadth of molecular weight distribution.

The mass % of the poly(butylenyl) substituent group having a particular total number of carbon atoms in Additive A, based on the total mass of the one or more 4-poly(butylenyl)benzene sulphonic acids of Additive A, is determined by measuring the mass distribution of the one or more 4-poly(butylenyl)benzene sulphonic acids of Additive A by gas chromatography (GC) and simulated distillation in accordance with ASTM D2887 using a flame ionization detector (FID), as described herein;

The mass % of the poly(propylenyl) substituent group having a particular total number of carbon atoms in Additive B, based on the total mass of the one or more 4-poly(propylenyl)benzene sulphonic acids of Additive B, is determined by measuring the mass distribution of the one or more 4-poly(propylenyl)benzene sulphonic acids of Additive A by gas chromatography (GC) and simulated distillation in accordance with ASTM D2887 using a flame ionization detector (FID), as described herein;

A reduction (or "reducing") in fouling is generally achieved when the ability of particulates to adhere to heated equipment surfaces of a refinery vessel is reduced, thereby mitigating their impact on the promotion of the fouling by the refineable petroleum feedstock which is at an elevated temperature;

All percentages reported are mass % on an active ingredient basis, i.e. without regard to carrier or diluent oil, unless otherwise stated.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined. Accordingly, any upper and lower quantity, range and ratio limits set forth herein associated with a particular technical feature of the present invention may be independently combined with any upper and lower quantity, range and ratio limits set forth herein associated with one or more other particular technical feature(s) of the present invention. Furthermore, any particular technical feature of the present invention, and all preferred variants thereof, may be independently combined with any other particular technical feature(s), and all preferred variants thereof, irrespective of whether such features are presented as preferred or not.

Also, it will be understood that the preferred features of each aspect of the present invention are regarded as preferred features of each and every other aspect of the present invention.

DETAILED DESCRIPTION OF THE INVENTION

Petroleum refinery operations separate (i.e. refine) crude oil, blends of different crude oils and fractions obtained from the refining of crude oil and blends thereof which fractions are refined further (herein referred to as a refineable petroleum feedstock) into useful commercial end-products, such as gasoline fuel, diesel fuel, jet fuel, heavy fuel oils, coke, fuel gases and lubricating oils.

Petroleum refinery operations include a large number of and different refinery processing units and auxiliary facilities. Typically, distillation is the primary means of separating the constituents of a refineable petroleum feedstock, such as crude oil. Fractions obtained from the refining of crude oil and blends thereof may be sold directly as commercial end-products or be used as feedstocks for further refinement in the petroleum refinery processes. The further petroleum refinery processes may involve separation by extraction or may use catalysts to change the chemical species such that a further range of commercial end-products are produced.

Typically, a petroleum refinery operation may include the following components and/or apparatus: a desalting unit; heat transfer components such as a heat exchanger, a furnace, a pre-heater (e.g. a crude preheater, a coker preheater), to heat the refineable petroleum feedstock; an atmospheric distillation unit; a vacuum distillation unit; a catalytic cracking unit; a catalytic hydrocracking unit; a visbreaker unit; a coking unit; a hydrotreater; a catalytic reforming unit; an isomerization unit.

Accordingly, the refineable petroleum feedstock is typically heated at elevated temperatures during a petroleum refinery operation and such elevated temperatures typically promote fouling of the components, and associated process transport mechanisms, of the petroleum refinery by the petroleum feedstock. Suitably, during a petroleum refinery operation, the refineable petroleum feedstock is at, and/or is heated to, an elevated temperature in one or more of the aforementioned components and/or apparatus of a refinery operation and the associated process transport mechanisms (e.g. tubes, piping, baffles) that are internal to, at least partially constitute, and/or are in direct fluid communication with such components and/or apparatus.

Suitably, the refinery vessel includes, but is not limited to, one or more of a heat transfer component, a distillation unit, a catalytic cracking unit, a catalytic hydrocracking unit, a visbreaker unit, a coking unit, a hydrotreater, a catalytic reforming unit, an isomerization unit, and the associated process transport mechanisms (e.g. tubes, piping, baffles) that are internal to, at least partially constitute, and/or are in direct fluid communication with such components and/or apparatus. Preferably, the refinery vessel includes, but is not limited to, one or more heat transfer components, especially a heat exchanger, a furnace/heater, a pre-heater (e.g. a crude oil preheater, a coker preheater), a distillation unit, a catalytic cracking unit, a catalytic hydrocracking unit, a visbreaker unit, a coking unit, and said associated process transport mechanisms. Even more preferably, the refinery vessel includes, but is not limited to, one or more of a a heat exchanger, a furnace/heater, a pre-heater (e.g. a crude oil preheater, a coker preheater), a distillation unit, such as an atmospheric or vacuum distillation unit, a coking unit, and said associated process transport mechanisms. Even more preferably, the refinery vessel includes one or more of a heat exchanger, a furnace/heater, a crude oil preheater, a coker preheater, especially a crude oil preheater and a furnace/ heater, used to heat the refineable petroleum feedstock, and said associated process transport mechanisms.

According to a highly preferred aspect of the invention, the refinery vessel includes one or more of a crude oil preheater located upstream of a desalting unit (i.e. a preheater located before a desalting unit), a crude oil heat exchanger located upstream of a desalting unit, a furnace located downstream of a desalting unit but upstream of a distillation unit (i.e. a furnace located after a desalting unit and before a distillation unit), and/or an atmospheric distillation unit and said associated process transport mechanisms.

Suitably, the refineable petroleum feedstock is at, preferably heated at, varying elevated temperatures during a refinery operation in the aforementioned different refinery vessels. Typically, the refineable petroleum feedstock (e.g. crude oil or a blend of crude oils) is pre-heated to a temperature of greater than 40, preferably greater than 60, more preferably greater than 80, ° C. in a pre-heater located upstream of a desalting unit. Typically, the refineable petroleum feedstock (e.g. crude oil or a blend of crude oils) is heated to a temperature of greater than 80, preferably greater than 100, more preferably greater than 120, ° C. in a heat exchanger located upstream of a desalting unit. Typically, the refineable petroleum feedstock (e.g. crude oil or a blend of crude oils) is heated to a temperature of greater than 200, preferably greater than 300, more preferably greater than 325, ° C. in a heater/furnace located upstream of a distillation unit, particularly such a furnace/heater located downstream of a desalting unit and upstream of a distillation unit, especially an atmospheric distillation unit. The refineable petroleum feedstock (e.g. a further refineable fraction obtained from refining of crude oil or a blend of crude oils) may be heated to a temperature of greater than 400, preferably greater than 500, more preferably greater than 600, ° C. in refinery vessels such as a catalytic cracker, a coking unit, a thermal cracker.

Suitably, the refineable petroleum feedstock is at, and/or heated to, an elevated a temperature in excess of 40, preferably greater than 60, preferably greater than 80, preferably greater than 100, preferably greater than 120, preferably greater than 200, preferably greater than 300, more preferably greater than 325, ° C. during the refinery operation.

Although the feedstock may be at, and/or heated to, an elevated temperature of greater than 500° C. during some refinery operations, suitably the feedstock is at, and/or heated to, an elevated temperature of less than or equal to 475, more preferably less than or equal to 450, more preferably less than or equal to 425, ° C. during the petroleum refinery operation.

Suitably, the refineable petroleum feedstock comprises crude oil or a crude oil blend comprising two or more different crude oils.

Suitably, the refineable petroleum feedstock has an asphaltene content.

Additive A

Additive A is one or more 4-poly(butylenyl)benzene sulphonic acid(s). The one or more 4-poly(butylenyl)benzene sulphonic acid(s) have a single sulphonic acid group and a single substituent group being the poly(butylenyl) substituent group attached to the para-position of the benzene ring with respect to the sulphonic acid group (i.e. the remainder of the benzene ring is not substituted and includes hydrogen atoms). It has been found that use of such mono-substituted one or more 4-poly(butylenyl)benzene sulphonic acid(s) typically provides an improved reduction of fouling of the refinery vessel and/or a further reduction of asphaltene agglomeration (or flocculation) and/or asphaltene precipitation in and/or from the feedstock when the feedstock is heated at an elevated temperature, compared to the use of one or more 4-poly(alkylenyl)benzene sulphonic acid additive(s) which also include one or more further alkyl substituents ortho and/or meta to the poly(alkylenyl) substituent group (i.e. mono-substituted 4-poly(butylenyl)benzene sulphonic acid(s) are typically more effective).

The one or more 4-poly(butylenyl)benzene sulphonic acid(s) (Additive A) includes the sulphonic acid group as the free acid. Additive A is ashless and does not include salts (e.g. metal salts) of the sulphonic acid.

Suitably, Additive A is derived from the polymerization of butene, preferably but-1-ene.

Typically, Additive A may be synthesized by standard experimental techniques which are well-known to those skilled in the art, for example, the intermediate one or more 4-poly(butylenyl)benzene(s) having the desired mass % of poly(butylenyl) substituent group having a particular total number of carbon atoms may be synthesized by reacting butene, especially but-1ene, with benzene using a Friedal-Crafts reaction (e.g. using a Friedal-Crafts catalyst such as a slurry of $AlCl_3$/HCl, at a reduced temperature, such as 3 to 10° C.). The intermediate one or more 4-poly(butylenyl)benzene(s) may then be sulphonated with a sulphonating agent (e.g. oleum, $SO_2$, $SO_3$), using standard techniques, to form the one or more 4-poly(butylenyl)benzene sulphonic acid(s) of Additive A having the desired characteristics, especially the desired mass % of poly(butylenyl) substituent group with a particular total number of carbon atoms. Suitably, the integrity of the poly(butylenyl) substituent group of the intermediate one or more poly(butylenyl)benzene(s) (e.g. the mass % of poly(butylenyl) substituent group having a particular total number of carbon atoms) is essentially maintained during the sulphonation reaction of the intermediate. Accordingly, the mass % of poly(butylenyl) substituent group having a particular total number of carbon atoms in the intermediate one or more 4-poly(butylenyl)benzene(s) is essentially identical to the mass % of poly(butylenyl) substituent group having a particular total number of carbon atoms in the one or more 4-poly(butylenyl)benzene sulphonic acid(s) of Additive A.

The appropriate poly(butylene) reactant used to form the intermediate one or more 4-poly(butylenyl)benzene(s) may be produced by polymerizing butene, particularly but-1-ene, using an appropriate catalyst system e.g. $EtAlCl_3$ and HCl. A suitable source of butene, particularly but-1-ene, is the Raffinate II stream obtained as a byproduct from the synthesis of poly(isobutylene), for example as disclosed in U.S. Pat. No. 4,952,739. Suitably, the characteristics of the poly (butylene) reactant (e.g. $M_n$, $M_w$, mass % of poly(butylene) having a particular number of total carbon atoms) should be substantially the same as the corresponding desired characteristics of the poly(butylenyl) substituent group in the intermediate one or more 4-poly(butylenyl)benzene(s) and in the one or more 4-poly(butylenyl)benzene sulphonic acid(s) of Additive A. Suitably, a preferred poly(butylene) is obtained by polymerizing but-1-ene wherein the poly(butylene) has: (i) a $M_n$ of from 450 to 650, preferably 500 to 600, daltons as measured by gel permeation chromatography (see W. W. Yau, J. J. Kirkland and D. D. Bly, "Modern Size Exclusion Liquid Chromatography", John Wiley and Sons, New York, 1979); (ii) a polydispersity of from 1.1 to 1.5, preferably 1.2 to 1.4; (iii) greater than 55, preferably greater than 60, mass % of the poly(butylene), based on the total mass of poly(butylene), has greater than or equal to 32 total carbon atoms as determined by GC in accordance with ASTM D2887; and, (iv) less than 35 mass % of the poly(butylene), based on the total mass of poly(butylene), has greater than or equal to 60 total carbon atoms as determined by GC in accordance with ASTM D2887.

Suitably, a high proportion of the poly(butylenyl) substituent groups of Additive A have a relatively narrow total carbon chain length distribution in which the poly(butylenyl) substituent group of greater than or equal to 50, preferably greater than or equal to 55, more preferably greater than or equal to 60, more preferably greater than or equal to 65, mass % of said one or more 4-poly(butylenyl) benzene sulphonic acids, based on the total mass of all said one or more 4-poly(butylenyl)benzene sulphonic acids, has greater than or equal to 32 total carbon atoms in said substituent group, as determined by GC in accordance with ASTM D2887. Suitably, the poly(butylenyl) substituent group of less than or equal to 35, preferably less than or equal to 30, more preferably less than or equal to 25, more preferably less than or equal to 20, mass % of said one or more 4-poly(butylenyl)benzene sulphonic acids of Additive A, based on the total mass of all said one or more 4-poly(butylenyl)benzene sulphonic acids, has greater than or equal to 60 total carbon atoms in said substituent group, as determined by GC in accordance with ASTM D2887.

Suitably, the poly(butylenyl) substituent group of from 40 to 70, preferably 40 to 65, mass % of said one or more 4-poly(butylenyl)benzene sulphonic acid(s) of Additive A, based on the total mass of all said one or more 4-poly(butylenyl)benzene sulphonic acid(s), has from 32 to 56 total carbon atoms in said substituent group, as determined by GC in accordance with ASTM D2887.

Suitably, the poly(butylenyl) substituent group of said one or more 4-poly(butylenyl)benzene sulphonic acids includes a poly(butylenyl) substituent group having 32, 36, 40, 44 and/or 48, preferably 32, 36 and/or 40, total carbon atoms.

Suitably, Additive A has a number average molecular weight ($M_n$) of greater than or equal to 550, preferably greater than or equal to 600, more preferably greater than or equal to 650, daltons, as determined by the liquid-liquid extraction and two-phase potentiometric titration method described herein.

Suitably, Additive A has a number average molecular weight ($M_n$) of less than or equal to 800, preferably less than or equal to 750, more preferably less than or equal to 700, daltons, as determined by the liquid-liquid extraction and two-phase potentiometric titration method described herein.

Suitably, Additive A has a polydispersity index of from 1.1 to 1.5, preferably 1.2 to 1.4.

Suitably, the poly(butylenyl) substituent groups of said one or more 4-poly(butylenyl)benzene sulphonic acids have a branched chain structure. In other words, the poly(butylenyl) substituent group of said one or more 4-poly(butylenyl)benzene sulphonic acids comprises one or more branched chain butanediyl repeating radicals.

Suitably, the poly(butylenyl) substituent groups of the one or more 4-poly(butylenyl)benzene sulphonic acids includes one or more poly(butylenyl) substituent groups bonded by the C-2 or C-1 position of the poly(butylenyl) substituent group to the para-position of benzene ring.

Additive A may be present in the refineable petroleum feedstock in an amount of from 1 to 1000, preferably 1 to 500, more preferably 1 to 100, even more preferably 1 to less than 100, ppm by mass, based on the total mass of the feedstock.

Suitably, Additive A, as defined herein, may be represented by one or more compounds of Formula I

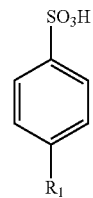

Formula I where each $R_1$ independently represents a poly(butylenyl) substituent group, as defined herein.

Additive A may be added to the petroleum feedstock when the feedstock is at the petroleum refinery and/or before the feedstock arrives at the petroleum refinery. When Additive A is added to the feedstock at the petroleum refinery it may be added at any stage during and/or before a petroleum refinery operation. Examples of when Additive A may be added to the petroleum feedstock include, but are not limited to, transport lines between the oil well and petroleum refinery, storage tanks located between the oil well and petroleum refinery, storage tanks at the refinery, during a refinery operation before or whilst the feedstock enters a heating unit (e.g. pre-heater, heat exchanger or furnace), during a refinery operation before or whilst the feedstock enters a heating unit (e.g. preheater) located up-stream of a desalting unit, during a refinery operation before or whilst the feedstock enters a heating unit (e.g. furnace) located downstream of a desalting unit and upstream of a distillation unit, during a refinery operation before or whilst the feedstock enters a heating unit (e.g. furnace) located downstream of a distillation unit but upstream of a further refining unit, such as a catalytic cracking unit, a catalytic hydrocracking unit, a visbreaker unit, a coking unit, and/or the associated process transport mechanisms (e.g. tubes, piping, baffles) that are internal to, at least partially constitute, and/or are in direct fluid communication with all such components and/or apparatus. Preferably, Additive A is added to the petroleum feedstock at the refinery. More preferably, Additive A is added to the feedstock during a refinery operation and before or whilst the feedstock enters a heating unit (e.g. pre-heater, heat exchanger or furnace), even more preferably at one of the following stages (i) before or whilst the feedstock enters a heating unit (e.g. preheater or heat exchanger) located up-stream of a desalting unit; (ii) before or whilst the feedstock enters a heating unit (e.g. furnace) located downstream of a desalting unit and upstream of a distillation unit.

Additive A may be added to the petroleum feedstock by methods well known to those skilled in the art. For example, Additive A may be blended into the petroleum feedstock and/or injected into a flowline transporting the petroleum feedstock.

Suitable Additives A for use in the invention are available from Infineum UK Limited.

Additive B

Additive B is one or more 4-poly(propylenyl)benzene sulphonic acid(s). The one or more 4-poly(propylenyl)benzene sulphonic acid(s) have a single sulphonic acid group and a single substituent group being the poly(propylenyl) substituent group attached to the para-position of the benzene ring with respect to the sulphonic acid group (i.e. the remainder of the benzene ring is not substituted and includes hydrogen atoms). It has been found that use of such mono-substituted one or more 4-poly(propylenyl)benzene sulphonic acid(s) typically provides an improved reduction of fouling of the refinery vessel and/or a further reduction of asphaltene agglomeration (or flocculation) and/or asphaltene precipitation in and/or from the feedstock when the feedstock is heated at an elevated temperature. Further, it has been found that use of such mono-substituted one or more 4-poly(propylenyl)benzene sulphonic acid(s) (Additive B), when used in combination with Additive A, may provide a synergistic reduction in fouling by the feedstock, and/or a synergistic reduction of asphaltene agglomeration (or flocculation) and/or asphaltene precipitation in and/or from the feedstock when the feedstock is heated at an elevated temperature.

The one or more 4-poly(propylenyl)benzene sulphonic acid(s) includes the sulphonic acid group as the free acid. Additive B is ashless and does not include salts (e.g. metal salts) of the sulphonic acid.

Suitably, Additive B is derived from the polymerization of prop-1-ene.

Typically, Additive B may be synthesized by standard experimental techniques which are well-known to those skilled in the art. For example, Additive B may be synthesized by analogous techniques as described herein for Additive A by substituting the poly(butylene) reactant with the appropriate poly(propylene) reactant. Suitably, the integrity of the poly(propylenyl) substituent group of the intermediate one or more poly(propylenyl)benzene(s) (e.g. the mass % of poly(propylenyl) substituent group having a particular total number of carbon atoms) is essentially maintained during the sulphonation reaction of the intermediate. Accordingly, the mass % of poly(propylenyl) substituent group having a particular total number of carbon atoms in the intermediate one or more 4-poly(propylenyl)benzene(s) is essentially identical to the mass % of poly(propylenyl) substituent group having a particular total number of carbon atoms in the one or more 4-poly(propylenyl)benzene sulphonic acid(s) of Additive B.

The appropriate poly(propylene) reactant used to form the intermediate one or more 4-poly(propylenyl)benzene(s) may be produced by polymerizing propene, using an appropriate catalyst system e.g. boron trifluoride and water. Suitably, the characteristics of the poly(propylene) reactant (e.g. $M_n$, $M_w$, mass % of poly(butylene) having a particular number of total carbon atoms) should be substantially the same as the corresponding desired characteristics of the poly(propylenyl) substituent group in the intermediate one or more 4-poly(propylenyl)benzene(s) and in the one or more 4-poly(propylenyl)benzene sulphonic acid(s) of Additive B. Suitably, a preferred poly(propylene) reactant is obtained by polymerizing prop-1-ene wherein the poly(propylene) has: (i) a $M_n$ of from 250 to 400, preferably 300 to 375, daltons as measured by GC in accordance with ASTM D2887; (ii) greater than 55, preferably greater than 60, mass % of the poly(propylene), based on the total mass of poly(propylene), has greater than or equal to 21 total carbon atoms as determined by GC in accordance with ASTM D2887; and, (iii) less than 25 mass % of the poly(propylene), based on the total mass of poly(propylene), has greater than or equal to 30 total carbon atoms as determined by GC in accordance with ASTM D2887.

Suitably, a high proportion of the poly(propylenyl) substituent groups of Additive B have a narrow total carbon chain length distribution in which the poly(propylenyl) substituent group of greater than or equal to 55, preferably greater than or equal to 60, more preferably greater than or equal to 65, more preferably greater than or equal to 70, even more preferably greater than or equal to 75, mass % of said one or more 4-poly(propylenyl)benzene sulphonic acids of Additive B, based on the total mass of all said one or more 4-poly(propylenyl)benzene sulphonic acids, has greater than or equal to 21 total carbon atoms in said substituent group, as determined by GC in accordance with ASTM D2887. Suitably, the poly(propylenyl) substituent group of less than or equal to 30, preferably less than or equal to 25, more preferably less than or equal to 20, mass % of said one or more 4-poly(propylenyl)benzene sulphonic acids of Additive B, based on the total mass of all said one or more 4-poly(butylenyl)benzene sulphonic acids, has greater than or equal to 30 total carbon atoms in said substituent group, as determined by GC in accordance with ASTM D2887.

Suitably, the poly(propylenyl) substituent group of from 60 to 95, preferably 65 to 95, more preferably 70 to 90, mass % of said one or more 4-poly(propylenyl)benzene sulphonic acid(s) of Additive B, based on the total mass of all said one or more 4-poly(butylenyl)benzene sulphonic acid(s), has from 21 to 27 carbon atoms in said substituent group, as determined by GC in accordance with ASTM D2887.

Suitably, the poly(propylenyl) substituent group of said one or more poly(propylenyl)benzene sulphonic acids of Additive B includes a poly(propylenyl) substituent group having 21, 24 and/or 27 total carbon atoms.

Suitably, Additive B has a number average molecular weight ($M_n$) of greater than or equal to 400, preferably greater than or equal to 450, more preferably greater than or equal to 475, daltons, as determined by the liquid-liquid extraction and two-phase potentiometric titration method described herein.

Suitably, Additive B has a number average molecular weight ($M_n$) of less than or equal to 600, preferably less than or equal to 550, more preferably less than or equal to 525, daltons as determined by the liquid-liquid extraction and two-phase potentiometric titration method described herein.

Suitably, Additive B has a polydispersity index of from 1.1 to 1.5.

Suitably, the poly(propylenyl) substituent group of said one or more 4-poly(propylenyl)benzene sulphonic acids have a branched chain structure. In other words, the poly(propylenyl) substituent group comprises one or more branched chain propanediyl repeating radicals.

Suitably, the poly(propylenyl) substituent group of the one or more 4-poly(propylenyl)benzene sulphonic acids includes one or more poly(propylenyl) substituent groups bonded by the C-2 or C-1 position of the poly(propylenyl) substituent group to the para-position of the benzene ring.

Suitably, Additive B, as defined herein, may be represented by one or more compounds of Formula II

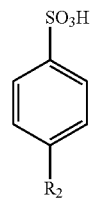

Formula II wherein each $R_2$ independently represents a poly(propylenyl) substituent group as defined herein.

Additive B may be present in the refineable petroleum feedstock in an amount of from 1 to 1000, preferably 1 to 500, more preferably 1 to 100, even more preferably 1 to less than 100, ppm by mass, based on the total mass of the feedstock.

Additive B may be added to the petroleum feedstock when the feedstock is at the petroleum refinery and/or before the feedstock arrives at the petroleum refinery. When Additive B is added to the feedstock at the petroleum refinery it may be added at any stage during and/or before a petroleum refinery operation. Examples of when Additive B may be added to the petroleum feedstock include, but are not limited to, transport lines between the oil well and petroleum refinery, storage tanks located between the oil well and petroleum refinery, storage tanks at the refinery, during a refinery operation before or whilst the feedstock enters a heating unit (e.g. pre-heater, heat exchanger or furnace), during a refinery operation before or whilst the feedstock enters a heating unit (e.g. preheater) located up-stream of a desalting unit, during a refinery operation before or whilst the feedstock enters a heating unit (e.g. furnace) located downstream of a desalting unit and upstream of a distillation unit, during a refinery operation before or whilst the feedstock enters a heating unit (e.g. furnace) located downstream of a distillation unit but upstream of a further refining unit, such as a catalytic cracking unit, a catalytic hydrocracking unit, a visbreaker unit, a coking unit, and/or the associated process transport mechanisms (e.g. tubes, piping, baffles) that are internal to, at least partially constitute, and/or are in direct fluid communication with all such components and/or apparatus. Preferably, Additive B is added to the petroleum feedstock at the refinery. More preferably, Additive B is added to the feedstock during a refinery operation and before or whilst the feedstock enters a heating unit (e.g. pre-heater, heat exchanger or furnace), even more preferably at one of the following stages (i) before or whilst the feedstock enters a heating unit (e.g. preheater or heat exchanger) located up-stream of a desalting unit; (ii) before or whilst the feedstock enters a heating unit (e.g. furnace) located downstream of a desalting unit and upstream of a distillation unit.

Additive B may be added to the petroleum feedstock by methods well known to those skilled in the art. For example, Additive B may be blended into the petroleum feedstock and/or injected into a flowline transporting the petroleum feedstock.

Suitable Additives B for use in the invention are available from Infineum UK Limited.

Unexpectedly, it has been found that when an effective minor amount of Additive B is added to the refineable petroleum feedstock in combination with Additive A, then a synergistic reduction of fouling, particularly asphaltene fouling, of a refinery vessel by the feedstock during a refinery operation on the feedstock may be achievable. Additionally, and/or alternatively, the use of a combination of Additive A and Additive B in a refineable petroleum feedstock may provide a synergistic reduction of asphaltene agglomeration (or flocculation) and/or asphaltene precipitation in and/or from the feedstock when the feedstock is heated at an elevated temperature, especially heated at an elevated temperature employed during a petroleum refinery operation. Suitably, the use of a combination of Additive A and Additive B has been found to provide a synergistic effect.

Additive B, when used in combination with Additive A, may be added to the refineable petroleum feedstock simultaneously or sequentially to Additive A. For example, a blend containing both of Additives A and B may be added to the petroleum feedstock; Additive A may be added to the feedstock initially followed by Additive B; or, Additive B may be added to the feedstock initially followed by Additive A. In a preferred embodiment when a combination of Additive A and Additive B is also added to the petroleum feedstock, both Additive A and Additive B are added to the feedstock essentially simultaneously.

Additive B may be added to the petroleum feedstock at the stage(s) of the petroleum refinery operation described herein in respect of Additive A. Accordingly, Additive B, when used in combination with Additive A, may be added to the refineable petroleum feedstock at the same stage or a different stage of the refinery operation as Additive A. Preferably, Additive B is added to the refineable petroleum feedstock at the same stage of the refinery operation as Additive A, more preferably Additive A and Additive B are added essentially simultaneously to the feedstock at the same stage of the refinery operation.

Suitably, when a combination of Additive A and Additive B is used, the combined treat rate of Additive A and Additive B is from 2 to 2000, preferably 2 to 1000, more preferably 2 to 200, even more preferably 2 to less than 100, ppm by mass, based on the total mass of the refineable petroleum feedstock.

Suitably, when a combination of Additive A and Additive B is used, the mass:mass ratio of Additive A to Additive B is in the range of 20:1 to 1:20, such as 10:1 to 1:10, preferably 3:1 to 1:3. More preferably, Additive A is used in an amount in excess of Additive B and the mass:mass ratio of Additive A to Additive B is in the range of 20:1 to 1:1, such as 10:1 to 1:1, preferably 3:1 to 1:1.

Compositions for Reducing Fouling

Additive A and/or Additive B may be used in compositions to prevent fouling; the compositions may further contain a hydrophobic oil solubilizer and/or a dispersant for the additive(s). Such solubilizers may include, for example, surfactants and/or carboxylic acid solubilizers.

The compositions may further include, for example, viscosity index improvers, anti-foamants, antiwear agents, demulsifiers, anti-oxidants, and other corrosion inhibitors.

EXAMPLES

The present invention is illustrated by but in no way limited to the following examples.

Liquid-Liquid Extraction and Potentiometric Titration to Determine $M_n$

The $M_n$ of a 4-poly(alkylenyl)benzene sulphonic acid, such as Additive A and Additive B as defined herein, is determined by the following method.

The 4-poly(alkylenyl)benzene sulphonic acid (typically 3 g) is weighed, the sample weight in grams is recorded (sample weight recorded as $P_1$) and the sample dissolved in propan-2-ol (15 ml). An alcoholic solution of phenolphthalein indicator is added to the 4-poly(alkylenyl)benzene sulphonic acid/propan-2-ol solution and the solution titrated with aqueous sodium hydroxide (1 N) until the indicator turns pink (the volume of sodium hydroxide added is recorded as $V_1$). Aqueous hydrochloric acid (1 N) is then added dropwise to this solution until the pink colour of the indicator disappears. The resulting solution, taking into account the combined volume of aqueous sodium hydroxide and aqueous hydrochloric acid added to the original 4-poly(alkylenyl)benzene sulphonic acid/propan-2-ol solution, is made up to form a solution containing a volume to volume ratio of water to propan-2-ol of 1:1, by the addition of the minimum volume of water if the combined volume of aqueous sodium hydroxide and aqueous hydrochloric acid added is less than 15 ml or by the addition of the minimum volume of propan-2-ol if the combined volume of aqueous sodium hydroxide and aqueous hydrochloric acid added is more than 15 ml. The resulting solution is extracted with pentane (1×40 mL and then 2×20 mL) and the combined pentane extracts washed with a water/propan-2-ol solution (1:1 ratio by volume, 3×15 ml). The combined water/propan-2-ol extracts are warmed at 60° C. to remove any traces of pentane, allowed to cool to room temperature and made up to 100 mL with a water/propan-2-ol solution (1:1 by volume) to form the final poly(alkylenyl)benzene sulphonic acid-water/propan-2-ol solution.

40 mL of the final poly(alkylenyl)benzene sulphonic acid-water/propan-2-ol solution is transferred to an empty pre-weighed beaker (empty beaker weight recorded in grams as $P_2$), the solution evaporated to dryness under a stream of nitrogen at 70° C., the product dried in an oven at 130-150° C. for at least 1 hour and then cooled to room temperature in a desiccator for 1 hour. The weight of the beaker and sample in grams is recorded as $P_3$. A further 40 mL of the final poly(alkylenyl)benzene sulphonic acid-water/propan-2-ol solution is transferred to a separating funnel, water (75 mL) and p-toluidine hydrochloride (2 g) added thereto and the resulting solution extracted with dichloromethane (1×40 mL and 2×20 ml). The combined dichloromethane extracts are added to a water/propan-2-ol solution (100 mL, 3:7 by volume) to form a two-phase solution. The two-phase solution is stirred and potentiometrically titrated against aqueous sodium hydroxide (0.1 N) using a Metrohm titration unit set to titrate at 20 microlitres; the volume of aqueous sodium hydroxide added to reach the end point is recorded as $V_2$.

To calibrate the potentiometric two-phase titration method, 40 mL of a water/propan-2-ol (1:1 by volume) solution not including any sample is transferred to a separating funnel, water (75 mL) and p-toluidine hydrochloride (2 g) added thereto and the resulting solution extracted with dichloromethane (1×40 mL and 2×20 ml). The dichloromethane extracts are added to a water/propan-2-ol solution (100 mL, 3:7 by volume) to form a two-phase solution. The two-phase solution is stirred and potentiometrically titrated against aqueous sodium hydroxide (0.1 N) using a Metrohm titration unit; the volume of aqueous sodium hydroxide added to reach the end point is recorded as $V_3$.

The number average molecular ($M_n$) of the 4-poly(alkylenyl)benzene sulphonic acid is calculated by the following equation:

$$Mn = \left(\left((P_3 - P_2) - \frac{A \times P_1 \times 71}{100 \times 49 \times 2.5}\right) \times \frac{1000}{(V_2 - V_3) \times N}\right) - 22$$

wherein:

$P_3$=weight (g) of beaker plus sample;

$P_2$=weight (g) of empty beaker;

A=mineral acidity of the 4-poly(alkylenyl)benzene sulphonic acid expressed as mass % of sulphuric acid as determined from ASTM D4711;

$P_1$=sample weight (g);

$V_2$=volume (ml) of NaOH (0.1N) added to the sample during potentiometric titration;

$V_3$=volume (ml) of NaOH (0.1N) added to two-phase solution during calibration of potentiometric titration;

N=Normality of sodium hydroxide solution use in potentiometric titration which is 0.1.

Gel Permeation Chromatography to determine $M_n$ of Poly(butylene)

$M_n$ of poly(butylene) is determined by gel permeation chromatography (see W. W. Yau, J. J. Kirkland and D. D. Bly, "Modern Size Exclusion Liquid Chromatography", John Wiley and Sons, New York, 1979) using a MIXED-D PLgel HPLC column from Agilent Technologies Inc, a refractive index detector (30° C.), a tetrahydrofuran mobile phase of 1 ml/minute and calibrated with an EasiCal PS-2 polystyrene standard from Agilent Technologies Inc.

Gas Chromatography and FID in Accordance with ASTM D2887

$M_w$ of Additive A, $M_w$ of Additive B, $M_w$ of the poly(butylene) used to synthesise Additive A, and $M_w$ and $M_n$ of the poly(propylene) used to synthesise Additive B, is determined by gas chromatography (GC) and simulated distillation using a flame ionization detector (FID) in accordance with ASTM D2887. Suitably, this analytical method yields the mass % distribution of poly(alkylenyl) substituent groups in Additive A and Additive B, respectively, having a specific total number of carbon atoms. Suitably, this analytical method yields the mass % distribution of poly(alkylene) chains in poly(butylene) and in poly(propylene) having a specific total number of carbon atoms.

The ASTM D2887 equipment and operating conditions are as follows: the chromatograph is not equipped with cryogenics since the starting temperature is 35° C.; samples are diluted in pentane instead of carbon disulfide; the equipment is calibrated using reference Boiling Point Calibration Sample 1 from Agilent Technologies Inc, Part Number 5080-8716, dissolved in carbon disulfide (i.e. a n-paraffinic sample of known composition); the gas chromatograph is a Hewlett Packard 5890 Series 2 Plus Chromatograph having a Restek MXT-1HT SimDist column, length 5 m, diameter 0.53 mm, film thickness 10 μm; the carrier gas is helium and an output flow of 6 ml/minute; the detector is a flame ionization detector, the oven temperature is set at 35° C. for 2 minutes then heated at a rate of 8° C./min to reach 410° C. and then held at this temperature for 15 minutes; injector type: on-column; the initial injector temperature is 38° C. and final temperature is 413° C. (injector temperature=oven temperature+3° C.); the FID detector temperature is 400° C.

Components

The following additive components and crude oil were used.

Component (A)

Component A represents Additive A as defined herein.

(i) Synthesis of Poly(butylene)

In a continuous process, a Raffinate II stream is polymerised using a concentrated hydrochloric acid and ethyl aluminium dichloride catalyst system (mass to mass ratio of HCl to $EtAlCl_2$ of 3:1) in Isopar-L solvent at a temperature of 25 to 45° C. for 30 minutes. The reactor product is washed with water and sodium hydroxide, and the product stripped of unreacted $C_4$ butylene/butanes (temperature of 200 to 230° C., pressure less than 0.5 bar) to produce poly(butylene) having: a $M_n$ of 540 daltons as measured by gel permeation chromatography; a polydispersity index of 1.3; greater than 55 mass % of the poly(butylene), based on the total mass of poly(butylene), has greater than or equal to 32 total carbon atoms as determined by GC in accordance with ASTM D2887.

(ii) Synthesis of 1-poly(butylenyl)benzene

In a continuous process, poly(butylene)(1 mole) from step (i) and benzene (14.5 mole) are reacted in the presence of an aluminium trichloride/hydrochloric acid catalyst slurry at a temperature of 3 to 8° C. for 45 minutes. The sludge is removed from the reactor and the remaining liquid phase in the reactor is washed multiple times with aqueous sodium hydroxide (7 wt %) at a temperature of 90 to 100° C., then washed with water and then the organic liquid phase distilled at 160 to 170° C. (atmospheric pressure) to remove excess benzene and to remove the lower boiling 1-poly(butylenyl) benzenes in which the polybutylenyl substituent group has less than 16 total carbon atoms. The desired 1-poly(butylenyl)benzene product is obtained by distillation at 320° C. under reduced pressure (20 to 40 mm Hg) to produce 1-poly(butylenyl)benzenes having: (i) a polydispersity of 1.3; (ii) the poly(butylenyl) substituent group of greater than or equal to 55 mass % of said one or more 1-poly(butylenyl) benzenes (has greater than or equal to 32 total carbon atoms in said substituent group as determined by GC in accordance with ASTM D2887; (iii) the poly(butylenyl) substituent group of from 40 to 70 mass % of said one or more 1-poly(butylenyl)benzenes has from 32 to 56 total carbon atoms in said substituent group as determined by GC in accordance with ASTM D2887; (iv) the poly(butylenyl) substituent group of less than or equal to 25 mass % of said one or more 1-poly(butylenyl)benzenes has greater than or equal to 60 total carbon atoms in said substituent group as determined by GC in accordance with ASTM D2887; (v) the poly(butylenyl) substituent group comprises a poly(butylenyl) substituent group having 32, 36 and/or 40 total carbon atoms; and, (vi) the poly(butylenyl) substituent group comprises poly(butylenyl) substituents having a branched chain structure.

(iii) Synthesis of 4-poly(butylenyl)benzene sulphonic Acid

A reactor is charged with the 1-poly(butylenyl)benzene product from step (ii), an excess of sulfur dioxide introduced with stirring (volume ratio of sulfur dioxide to 1-poly (butylenyl)benzene of 4:1) while maintaining the reaction temperature between 0 and −5° C., after which an excess of sulfur trioxide (mole ratio of sulfur trioxide to 1-poly (butylenyl)benzene of 120:1) is introduced while maintaining the reaction temperature between 0 and −5° C. The reaction mixture is then allowed to stand for 1 hour at a temperature of −2 to 5° C. The excess sulfur dioxide/sulfur trioxide is stripped off at 120° C. at 0.1 bar and the reaction mixture cooled to 60° C. to yield the title compound. The title compound may be diluted in diluent oil, such as SN80 (commercially available from Repsol).

The isolated 4-poly(butylenyl)benzene sulphonic acid has: (i) a $M_n$ of between 600 to 700 daltons; (ii) a polydispersity of 1.3; (iii) the poly(butylenyl) substituent group of greater than or equal to 55 mass % of said one or more 4-poly(butylenyl)benzene sulphonic acid(s) has greater than or equal to 32 total carbon atoms in said substituent group as determined by GC in accordance with ASTM D2887; (iv) the poly(butylenyl) substituent group of from 40 to 70 mass % of said one or more 4-poly(butylenyl)benzene sulphonic acid(s) has from 32 to 56 total carbon atoms in said substituent group as determined by GC in accordance with ASTM D2887; (v) the poly(butylenyl) substituent group of less than or equal to 25 mass % of said one or more 4-poly(butylenyl)benzene sulphonic acid(s) has greater than or equal to 60 total carbon atoms in said substituent group as determined by GC in accordance with ASTM D2887; (vi) the poly(butylenyl) substituent group comprises a poly (butylenyl) substituent group having 32, 36 and/or 40 total carbon atoms; and, (vii) the poly(butylenyl) substituent group comprises poly(butylenyl) substituents having a branched chain structure.

Suitable Additives A are available from Infineum UK Ltd, for example, comprising 83 mass % a.i. of 4-poly(butylenyl) benzene sulphonic acids.

Component (B)

Component B represents Additive B as defined herein.

(i) Synthesis of Poly(propylene)

A sealed reactor is charged with propene, boron trifluoride catalyst and water as cocatalyst (molar ratio of boron trifluoride to water of 1:2) at 24 to 28° C. and a pressure of 16 bar, and the resulting reaction mixture agitated for 1 hour. The reaction mixture is then heated to 50° C. (atmospheric pressure) initially, and then to 90 to 120° C. under vacuum (60 mbar) to distil off residual propane, boron trifluoride and boron trifluoride/water complex. The residual purified poly (propylene) remaining in the reactor is cooled and stored at 60° C., the poly(propylene) has: (i) a $M_n$ of 340 daltons as measured by GC in accordance with ASTM D2887; (ii) greater than 65 mass % of the poly(propylene), based on the total mass of poly(propylene), has greater than or equal to 21 total carbon atoms as determined by GC in accordance with ASTM D2887; and, (iii) less than 25 mass % of the poly(propylene), based on the total mass of poly(propylene), has greater than or equal to 30 total carbon atoms as determined by GC in accordance with ASTM D2887.

(ii) Synthesis of 1-poly(propylenyl)benzene

The title compound is synthesised from poly(propylene) obtained from step (i) using the same procedure to form 1-poly(butylenyl)benzene as described in step (ii) for Component A using a mole to mole ratio of benzene to poly (propylene) of 7.5:1.

The 1-poly(propylenyl)benzene product is obtained by distillation at 295° C. under reduced pressure (20 to 40 mm Hg) to produce 1-poly(propylenyl)benzenes wherein: (i) the poly(propylenyl) substituent group of greater than or equal to 60 mass % of said one or more 1-poly(propylenyl) benzenes has greater than or equal to 21 total carbon atoms in said substituent group as determined by GC in accordance with ASTM D2887; (ii) the poly(propylenyl) substituent group of from 65 to 90 mass % of said one or more 1-poly(propylenyl)benzenes has from 21 to 27 total carbon atoms in said substituent group as determined by GC in accordance with ASTM D2887; (iii) the poly(propylenyl) substituent group of less than or equal to 25 mass % of said one or more 1-poly(propylenyl)benzenes has greater than or equal to 30 total carbon atoms in said substituent group as determined by GC in accordance with ASTM D2887; (v) the poly(propylenyl) substituent group comprises a poly(propylenyl) substituent group having 21, 24 and/or 27 total carbon atoms; and, (v) the poly(propylenyl) substituent group comprises poly(propylenyl) substituents having a branched chain structure.

(iii) Synthesis of 4-poly(propylenyl)benzene sulphonic Acid

The title compound is synthesised from the 1-poly(propylenyl)benzene product of step (ii) using the same procedure to form 4-poly(butylenyl)benzene sulphonic acid as described in step (iii) for Component A.

The isolated 4-poly(propylenyl)benzene sulphonic acid has: (i) a $M_n$ of between 450 to 550 daltons; (ii) the poly(propylenyl) substituent group of greater than or equal to 60 mass % of said one or more 4-poly(propylenyl) benzene sulphonic acid(s) has greater than or equal to 21 total carbon atoms in said substituent group as determined by GC in accordance with ASTM D2887; (iii) the poly (propylenyl) substituent group of from 65 to 90 mass % of said one or more 4-poly(propylenyl)benzene sulphonic acid (s) has from 21 to 27 total carbon atoms in said substituent group as determined by GC in accordance with ASTM D2887; (iv) the poly(propylenyl) substituent group of less than or equal to 25 mass % of said one or more 4-poly (propylenyl)benzene sulphonic acid(s) has greater than or equal to 30 total carbon atoms in said substituent group as determined by GC in accordance with ASTM D2887; (v) the poly(propylenyl) substituent group comprises a poly(propylenyl) substituent group having 21, 24 and/or 27 total carbon atoms; and, (vi) the poly(propylenyl) substituent group comprises poly(propylenyl) substituents having a branched chain structure Suitable Additives B are available from Infineum UK Ltd, for example, comprising 85 mass % a.i. of 4-poly(propylenyl)benzene sulphonic acids.

Component (C)

Component C represents a comparative additive and is available from Infineum UK Limited. Component C comprises 81.5 mass % a.i. 4-poly(propylenyl)-2,3-(dimethyl) sulphonic acid. The 4-poly(propylenyl) substituent group is derived from the polymerisation of prop-1-ene having a $M_n$ of 200 daltons, it has a branched-chain structure, and greater than 60 mass % of the substituent group has greater than 12 total carbon atoms.

Crude Oil Blend

A blend of Basra heavy crude oil having an asphaltene content, Enbridge crude oil plus shale oil at respective percentages of 40, 10 and 50%.

Testing

Tests were carried out using 150 ml samples of the crude oil blend containing no additives (as a control), and containing the respective amounts of the additive component(s) as indicated in the results table below, added to the crude oil blend as a cutback.

The tests used a 5 Rod Thermal Deposition Test (5-RTDT) which aims to simulate refinery antifoulant performance. The 5-RTDT uses apparatus having five independently-heated test sections connected in series. Each test section comprises an electrically resistively-heated steel rod encased in an outer steel jacket, which is electrically isolated from the rod. The test crude oil sample flows in the cavity between the rod and the jacket. The rod temperature is controlled at the centre point of the rod and is maintained constant throughout the test. As the crude oil flows over the hot rod in each test section, it absorbs heat from the rod; the temperature of the crude oil entering and leaving each test section is recorded. If deposits accumulate on the rod surface, they reduce the heat transfer efficiency from the rod to the crude oil thus giving rise to a reduction in the temperature of the crude oil leaving and entering the respective test section.

The difference in crude oil outlet temperature ($\Delta T$ ° C.) between the start to the end of the test is calculated and summed for each of the five rods (i.e. each test section). A larger number indicates a greater temperature difference and hence worse fouling. Tests were carried out for five hours with respective rod temperatures of 120, 160, 200, 240 and 280, ° C.

Each of the 5 rods is weighed before and after testing to determine particulate, especially asphaltene, deposition.

Results

| Additive(s) (treat rate; ppm a.i.) | Ratio of A:B (treat rate; ppm a.i.) | DEPOSITS (mg) | $\Delta T$ (° C.) |
|---|---|---|---|
| None | — | 143 | −74 |
| A (830 ppm) | — | 42 | −21 |
| B (850 ppm) | — | 90 | −27 |
| C (815 ppm) | — | 76 | −70 |
| A + B (835 ppm) | 3:1 | 42 | −12 |
| A + B (840 ppm) | 1:1 | 47 | −12 |
| A + B (845 ppm) | 1:3 | 67 | −37 |

The results show that, in both tests, when a single additive is used Additive A gave the best anti-fouling results in terms of both deposits (mg) and $\Delta T$ ° C. Additive B provided particularly good anti-fouling results in terms of $\Delta T$ ° C. The results also show that, in both tests, a combination of Additive A and Additive B ((A)+(B) at 835 ppm and in a 3:1 ratio) gave the best overall anti-fouling results, and that (A) and (B) operate synergistically. Comparative additive C, performed better than the control (no additive) but significantly worse than Additive A, and also the combination of Additive A and Additive B.

What is claimed is:

1. A process for reducing or preventing fouling in a refinery vessel during a petroleum refinery operation of a refineable petroleum feedstock, the process comprising providing a refineable petroleum feedstock in fluid communication with a refinery vessel during a petroleum refinery operation, the refineable petroleum feedstock being at an elevated temperature during the refinery operation, the refineable petroleum feedstock including Additive A or Additive B, or a combination of Additive A and Additive B, wherein:
   (i) Additive A, when present, is present in an effective minor amount of from 1 to 1000 ppm by mass, based on the total mass of the refineable petroleum feedstock, and Additive (A) comprises one or more 4-poly(butylenyl)benzene sulphonic acid(s), wherein the poly (butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC, a number average molecular weight ($M_n$) of from 550 to 800 daltons, and a polydispersity index of from 1.1 to 1.5; and,
   (ii) Additive B, when present, is present in an effective minor amount of from 1 to 1000 ppm by mass, based on the total mass of the refineable petroleum feedstock, and Additive B comprises one or more 4-poly(propylenyl)benzene sulphonic acids wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid (s), has greater than or equal to 21 total carbon atoms in said substituent group, as determined by GC.

2. A process for reducing or preventing asphaltene agglomeration (or flocculation) and/or asphaltene precipitation in and/or from a refineable petroleum feedstock having an asphaltene content, when said feedstock is heated at an elevated temperature, the process comprising treatment of said refineable petroleum feedstock with an effective minor amount of Additive A or Additive B, or an effective minor amount of a combination of Additive A and Additive B, wherein:

Additive A comprises one or more 4-poly(butylenyl) benzene sulphonic acid(s), wherein the poly(butylenyl) substituent group of greater than 50 mass of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC, a number average molecular weight ($M_n$) of from 550 to 800 daltons, and a polydispersity index of from 1.1 to 1.5; and, Additive B comprises one or more 4-poly(propylenyl) benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

3. The process as claimed in claim 1, wherein the refineable petroleum feedstock is heated at an elevated temperature of greater than 40° C.

4. The process as claimed in claim 2, wherein the refineable petroleum feedstock is heated at an elevated temperature of greater than 40° C.

5. The process or use as claimed in claim 1, wherein the refineable petroleum feedstock is heated at an elevated temperature of greater than 200° C.

6. The process or use as claimed in claim 2, wherein the refineable petroleum feedstock is heated at an elevated temperature of greater than 200° C.

7. The process as claimed in claim 1, wherein the refineable petroleum feedstock comprises a crude oil, a crude oil blend comprising two or more different types of crude oil, and fractions obtained from refining a crude oil and a crude oil blend which fractions are further refined in a petroleum refinery operation.

8. The process as claimed in claim 2, wherein the refineable petroleum feedstock comprises a crude oil, a crude oil blend comprising two or more different types of crude oil, and fractions obtained from refining a crude oil and a crude oil blend which fractions are further refined in a petroleum refinery operation.

9. The process as claimed in claim 1, wherein the refinery vessel is selected from one or more of: a heat transfer component comprising a heat exchanger, a furnace/heater, and/or a pre-heater for heating said petroleum feedstock; a distillation unit; a catalytic cracking unit; a hydrocracker; a visbreaker; a coker unit; a hydrotreater; a catalytic reformer; an alkylation unit; and, said associated process transport mechanisms that are internal to, at least partially constitute, and/or are in direct fluid communication with such components.

10. The process as claimed in claim 1, wherein Additive A or Additive B, or a combination of Additive A and Additive B, is each independently added to the refineable petroleum feedstock when said feedstock is at a petroleum refinery and/or before said feedstock is at a petroleum refinery.

11. The process as claimed in claim 2, wherein Additive A or Additive B, or a combination of Additive A and Additive B, is each independently added to the refineable petroleum feedstock when said feedstock is at a petroleum refinery and/or before said feedstock is at a petroleum refinery.

12. The process as claimed in claim 10, wherein Additive A or Additive B, or a combination of Additive A and Additive B, is each independently added to the refineable petroleum feedstock at a petroleum refinery and during or before a petroleum refinery operation on said feedstock.

13. The process as claimed in claim 11, wherein Additive A or Additive B, or a combination of Additive A and Additive B, is each independently added to the refineable petroleum feedstock at a petroleum refinery and during or before a petroleum refinery operation on said feedstock.

14. The process as claimed in claim 12, wherein Additive A or Additive B, or a combination of Additive A and Additive B, is each independently added to the refineable petroleum feedstock at one or more of the following stages: (i) before the feedstock enters a pre-heater located up-stream of a desalting unit; (ii) before the feedstock enters a heat exchanger located upstream of a desalting unit; (iii) before the feedstock enters a furnace/heater located downstream of a desalting unit and upstream of a distillation unit.

15. The process as claimed in claim 13, wherein Additive A or Additive B, or a combination of Additive A and Additive B, is each independently added to the refineable petroleum feedstock at one or more of the following stages: (i) before the feedstock enters a pre-heater located up-stream of a desalting unit; (ii) before the feedstock enters a heat exchanger located upstream of a desalting unit; and (iii) before the feedstock enters a furnace/heater located downstream of a desalting unit and upstream of a distillation unit.

16. The process as claimed in claim 1, wherein the poly(butylenyl) substituent group of less than 30 mass % of said one or more 4-poly(butylenyl)benzene sulphonic acid(s) of Additive A, based on the total mass of all said one or more 4-poly(butylenyl)benzene sulphonic acid(s), has greater than or equal to 60 total carbon atoms in said substituent group, as determined by GC.

17. The process as claimed in claim 1, wherein the poly(butylenyl) substituent group of less than 30 mass % of said one or more 4-poly(butylenyl)benzene sulphonic acid(s) of Additive A, based on the total mass of all said one or more 4-poly(butylenyl)benzene sulphonic acid(s), has greater than or equal to 60 total carbon atoms in said substituent group, as determined by GC.

18. The process as claimed in claim 1, wherein the poly(butylenyl) substituent group of from 40 to 70 mass % of said one or more 4-poly(butylenyl)benzene sulphonic acid(s) of Additive A, based on the total mass of all said one or more 4-poly(butylenyl)benzene sulphonic acid(s), has from 32 to 56 total carbon atoms in said substituent group, as determined by GC.

19. The process as claimed in claim 2, wherein the poly(butylenyl) substituent group of from 40 to 70 mass % of said one or more 4-poly(butylenyl)benzene sulphonic acid(s) of Additive A, based on the total mass of all said one or more 4-poly(butylenyl)benzene sulphonic acid(s), has from 32 to 56 total carbon atoms in said substituent group, as determined by GC.

20. The process as claimed in claim 1, wherein the poly(butylenyl) substituent group of said one or more 4-poly(butylenyl)benzene sulphonic acid(s) of Additive A has a branched chain structure.

21. The process as claimed in claim 2, wherein the poly(butylenyl) substituent group of said one or more 4-poly(butylenyl)benzene sulphonic acid(s) of Additive A has a branched chain structure.

22. The process as claimed in claim 1, wherein the poly(butylenyl) substituent group of said one or more 4-poly(butylenyl)benzene sulphonic acids of Additive A is derived from the polymerization of but-1-ene.

23. The process as claimed in claim 2, wherein the poly(butylenyl) substituent group of said one or more 4-poly(butylenyl)benzene sulphonic acids of Additive A is derived from the polymerization of but-1-ene.

24. The process as claimed in claim 1, wherein the poly(propylenyl) substituent group of from 60 to 95 mass % of said one or more 4-poly(propylenyl)benzene sulphonic acid(s) of Additive 13, based on the total mass of all said one or more 4-poly(propylenyl)benzene sulphonic acid(s), has from 21 to 30 total carbon atoms in said substituent group, as determined by GC.

25. The process as claimed in claim 2, wherein the poly(propylenyl) substituent group of from 60 to 95 mass % of said one or more 4-poly(propylenyl)benzene sulphonic acid(s) of Additive B, based on the total mass of all said one or more 4-poly(propylenyl)benzene sulphonic acid(s), has from 21 to 30 total carbon atoms in said substituent group, as determined by GC.

26. The process as claimed in claim 1, wherein Additive B has a number average molecular weight ($M_n$) of from 400 to 600 daltons.

27. The process as claimed in claim 2, wherein Additive B has a number average molecular weight ($M_n$) of from 400 to 600 daltons.

28. The process as claimed in claim 1, wherein the poly(propylenyl) substituent group of said one or more 4-poly(propylenyl)benzene sulphonic acids of Additive B is derived from the polymerization of prop-1-ene.

29. The process as claimed in claim 2, wherein the poly(propylenyl) substituent group of said one or more 4-poly(propylenyl)benzene sulphonic acids of Additive B is derived from the polymerization of prop-1-ene.

30. The process as claimed in claim 1, wherein Additive A and Additive B are used in combination and the mass:mass ratio of Additive A to Additive B is in the range of 10:1 to 1:10.

31. The process as claimed in claim 2, wherein Additive A and Additive B are used in combination and the mass:mass ratio of Additive A to Additive B is in the range of 10:1 to 1:10.

32. The process as claimed in claim 1, wherein Additive A and Additive B are used in combination and the combined treat rate of Additive A and Additive B is from 2 to 2000 ppm by mass, based on the total mass of the refineable petroleum feedstock.

33. The process as claimed in claim 2, wherein Additive A and Additive B are used in combination and the combined treat rate of Additive A and Additive B is from 2 to 2000 ppm by mass, based on the total mass of the refineable petroleum feedstock.

34. The process as claimed in claim 1, wherein the refineable petroleum feedstock has an asphaltene content.

35. A system for refining a refineable petroleum feedstock, the system comprising: (a) a refinery vessel for refining the refineable petroleum feedstock at an elevated temperature; and, (b) a refineable petroleum feedstock in fluid communication with the refinery vessel, wherein the refineable petroleum feedstock includes Additive A or Additive B, or a combination of Additive A and Additive B, wherein:

(i) Additive A, when present, is present in an effective minor amount of from 1 to 1000 ppm by mass, based on the total mass of the refineable petroleum feedstock, and Additive (A) comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC, a number average molecular weight ($M_n$) of from 550 to 800 daltons, and a polydispersity index of from 1.1 to 1.5; and, (ii) Additive B, when present, is present in an effective minor amount of from 1 to 1000 ppm by mass, based on the total mass of the refineable petroleum feedstock, and Additive B comprises one or more 4-poly(propylenyl)benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

* * * * *

UNITED STATES PATENT AND TRADEMARK OFFICE
CERTIFICATE OF CORRECTION

PATENT NO. : 11,332,681 B2
APPLICATION NO. : 17/018264
DATED : May 17, 2022
INVENTOR(S) : Colin Morton et al.

Page 1 of 1

It is certified that error appears in the above-identified patent and that said Letters Patent is hereby corrected as shown below:

In the Claims

In Claim 2 – on 12th Line, replace "50 mass of said" with "50 mass % of said"

In Claim 24 – on 4th Line, replace "Additive 13, based" with "Additive B, based"

Signed and Sealed this
Nineteenth Day of July, 2022

Katherine Kelly Vidal
*Director of the United States Patent and Trademark Office*